(12) United States Patent  
Tsukahara et al.

(10) Patent No.: US 8,767,268 B2
(45) Date of Patent: Jul. 1, 2014

(54) IMAGE READING APPARATUS, IMAGE FORMING APPARATUS, AND SHADING CORRECTION METHOD

(75) Inventors: Hajime Tsukahara, Kanagawa (JP); Makio Kondo, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 499 days.

(21) Appl. No.: 13/215,680

(22) Filed: Aug. 23, 2011

(65) Prior Publication Data

US 2012/0057210 A1 Mar. 8, 2012

(30) Foreign Application Priority Data

Sep. 2, 2010 (JP) ................................. 2010-196694

(51) Int. Cl.
*H04N 1/40* (2006.01)
(52) U.S. Cl.
USPC ......................................................... 358/461
(58) Field of Classification Search
None
See application file for complete search history.

(56) References Cited

U.S. PATENT DOCUMENTS

| 7,542,177 B2 | 6/2009 | Kondoh |
| 2011/0109945 A1 | 5/2011 | Tsukahara |

FOREIGN PATENT DOCUMENTS

| JP | 8-9116 | 1/1996 |
| JP | 2002-176541 | 6/2002 |
| JP | 2003-37717 | 2/2003 |
| JP | 2003-333327 | 11/2003 |
| JP | 3565479 B2 | 6/2004 |
| JP | 4148655 B2 | 7/2008 |

*Primary Examiner* — Mark Zimmerman
*Assistant Examiner* — John Wallace
(74) *Attorney, Agent, or Firm* — Oblon, Spivak, McClelland, Maier & Neustadt, L.L.P.

(57) ABSTRACT

A correction-data generating unit divides, into a matrix of row blocks in a sub scanning direction and column blocks in a main scanning direction, white data on a transfer drum read by a reading unit during a predetermined time period that is shorter than a time period in which the read point of the transfer drum is returned to a position where the reading unit has started reading the first white reference member, calculates, for each column of the matrix, a correction-data candidate value corresponding to a variation ratio of a mean of data of the row blocks in the sub-scanning direction, and determines a minimum value of the calculated correction-data candidate values as the correction data. A shading-data correcting corrects the shading data by using the generated correction data. A shading correcting unit performs shading correction on image data of a document after the correction data is generated.

10 Claims, 15 Drawing Sheets

IMAGE READING APPARATUS, IMAGE FORMING APPARATUS, AND SHADING CORRECTION METHOD

CROSS-REFERENCE TO RELATED APPLICATIONS

The present application claims priority to and incorporates by reference the entire contents of Japanese Patent Application No. 2010-196694 filed in Japan on Sep. 2, 2010.

BACKGROUND OF THE INVENTION

1. Field of the Invention

The present invention relates to an image reading apparatus, an image forming apparatus, and a shading correction method.

2. Description of the Related Art

A conventional image reading apparatus that optically reads a document so as to generate image data is known. In the image reading apparatus, due to various factors including variation in the sensitivity of a plurality of pixels of an image sensor, variation in the amount of light transmitted through a lens, variation in the illumination intensity of an illumination/optical system causing light intensity distribution in the main scanning direction or being caused by deterioration thereof, the output from a light receiving element to each corresponding pixel does not always have a constant or uniform value; therefore, shading correction is performed.

In the shading correction, before reading a document, a white reference member, being arranged near a document placement unit on which a document is placed, is irradiated with light from a light source, and the reflected light is read by a light receiving element so that white level reference data is obtained. During the shading correction, shading data is generated in reference to the obtained white level reference data and, by using the generated shading data, shading correction is performed on image data on the document that is read after the white reference member is read; thus, the image data is normalized.

In some image reading apparatuses, a document is conveyed by an automatic document feeder (ADF) and read by an optical reading system that is fixed at a predetermined position (hereafter, referred to as ADF reading).

With the image reading apparatus that performs the ADF reading as described above, it is necessary to move the optical reading system, which reads a document at a predetermined position, to the read position of the white reference member so as to generate shading data. If the optical reading system is moved every time a document is read, image data productivity is decreased. If shading data is continuously used without moving the optical reading system every time a document is read, accurate shading correction corresponding to the light intensity of the light source cannot be performed because the light intensity varies due to a change in the surface temperature of a tube of the light source.

For example, Japanese Patent Application Laid-open No. 2003-037717 discloses a technology in which the mean level of white reference of a second reference white plate, which is arranged outside the effective pixel area at the read position, is calculated in a sheet interval during which ADF reading is being performed, and shading data is corrected by using the ratio of the calculated mean level to the mean level that has been calculated in the previous sheet interval. According to the technology disclosed in Japanese Patent Application Laid-open No. 2003-037717, accurate shading correction corresponding to a change in the light intensity of the light source can be performed without generating shading data each time.

In the technology disclosed in Japanese Patent Application Laid-open No. 2003-037717, the presence of the second reference white plate used for correcting shading data being arranged outside the effective pixel area increases the size of the image reading apparatus and, because the necessity of enlarging an image sensor increases the costs for producing and running the image reading apparatus.

A possible method for solving the above problem is to arrange a roller-shaped white reference member used for correcting shading data in the background of the document read position. In this case, dirt may adhere to the white reference member used for correcting shading data when a document is passing therethrough; therefore, because of the dirt, the white level of the white reference member used for correcting shading data may have an abnormal value, and accordingly, shading data that has been corrected by using this white level also may have an abnormal value. As a result, there is a possibility of the occurrence of an abnormal image.

For example, Japanese Patent No. 4148655 discloses the technology in which an area corresponding to more than one revolution of a read roller is read in a sheet interval during which ADF reading is being performed and shading data is corrected by using data on the cleanest area. By using the technology disclosed in Japanese Patent No. 4148655, it is possible to prevent the white level of the white reference member used for correcting shading data from becoming an abnormal level due to dirt and to avoid the occurrence of an abnormal image.

In the technology disclosed in Japanese Patent No. 4148655, it is necessary to ensure that there is enough reading time to read an area corresponding to more than one revolution of the read roller in a sheet interval during which document reading is being performed; therefore, if the actual sheet interval is shorter than the reading time, image data productivity is decreased.

SUMMARY OF THE INVENTION

It is an object of the present invention to at least partially solve the problems in the conventional technology.

According to an aspect of the present invention, there is provided an image reading apparatus including: a reading unit; a first white reference member that is located opposing a document read position of the reading unit and whose read point to be read by the reading unit is changed with time; a shading-data generating unit that generates shading data; a correction-data generating unit that, when a plurality of documents are continuously conveyed to the reading unit, generates correction data to be used for correcting the shading data in each time period in which the document is not read by the reading unit; a shading-data correcting unit that corrects the shading data by using the generated correction data; and a shading correcting unit that performs, by using the corrected shading data, shading correction on image data of a document that is read by the reading unit after the correction data is generated. The correction-data generating unit divides, into a matrix of row blocks in a sub scanning direction and column blocks in a main scanning direction, white data on the first white reference member read by the reading unit during a predetermined time period that is shorter than a time period in which the read point of the first white reference member is returned to a position where the reading unit has started reading the first white reference member, calculates, for each column of the matrix, a correction-data candidate value corresponding to a variation ratio of a mean of data of the row blocks in the sub-scanning direction, and determines a minimum value of the calculated correction-data candidate values as the correction data.

According to another aspect of the present invention, there is provided an image forming apparatus including: an image reading apparatus further including: a reading unit; a first white reference member that is located opposing a document read position of the reading unit and whose read point to be read by the reading unit is changed with time; a shading-data generating unit that generates shading data; a correction-data generating unit that, when a plurality of documents are continuously conveyed to the reading unit, generates correction data to be used for correcting the shading data in each time period in which the document is not read by the reading unit; a shading-data correcting unit that corrects the shading data by using the generated correction data; a shading correcting unit that performs, by using the corrected shading data, shading correction on image data of a document that is read by the reading unit after the correction data is generated. The correction-data generating unit divides, into a matrix of row blocks in a sub scanning direction and column blocks in a main scanning direction, white data on the first white reference member read by the reading unit during a predetermined time period that is shorter than a time period in which the read point of the first white reference member is returned to a position where the reading unit has started reading the first white reference member, calculates, for each column of the matrix, a correction-data candidate value corresponding to a variation ratio of a mean of data of the row blocks arranged in the sub-scanning direction, and determines a minimum value of the calculated correction-data candidate values as the correction data; and an image forming apparatus that forms an image by using the image data on which the shading correction has been performed.

According to still another aspect of the present invention, there is provided a shading correction method performed by an image reading apparatus, the image reading apparatus including a reading unit; and a first white reference member that is opposed to a document read position of the reading unit, a read point of the first white reference member that is read by the reading unit being changing with time, the method including: generating shading data by shading data generating unit; generating, when a plurality of documents are continuously conveyed by the reading unit, correction data in each time period in which the document is not read by the reading unit, the correction data being used for correcting the shading data; correcting the shading data by using the generated correction data; and performing, by using the corrected shading data, shading correction on image data of a document that is read by the reading unit after the correction data is generated. The generating the correction data includes dividing, into a matrix of row blocks in a sub scanning direction and column blocks in a main scanning direction, white data on the first white reference member read by the reading unit during a predetermined time period that is shorter than a time period in which the read point of the first white reference member is returned to a position where the reading unit has started reading the first white reference member, calculating, for each column of the matrix, a correction-data candidate value corresponding to a variation ratio of a mean of data of the row blocks in the sub-scanning direction, and determining a minimum value of the calculated correction-data candidate values as the correction data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading apparatus, an image forming apparatus, and a shading correction method according to the present invention are explained in detail below with reference to the accompanying drawings.

First Embodiment

By taking an image reading apparatus that includes an automatic document feeder (ADF) as an example, an explanation is given of shading correction, according to a first embodiment, in which a white reference member used for generating shading data is different from a white reference member used for generating correction data.

Figure 1:
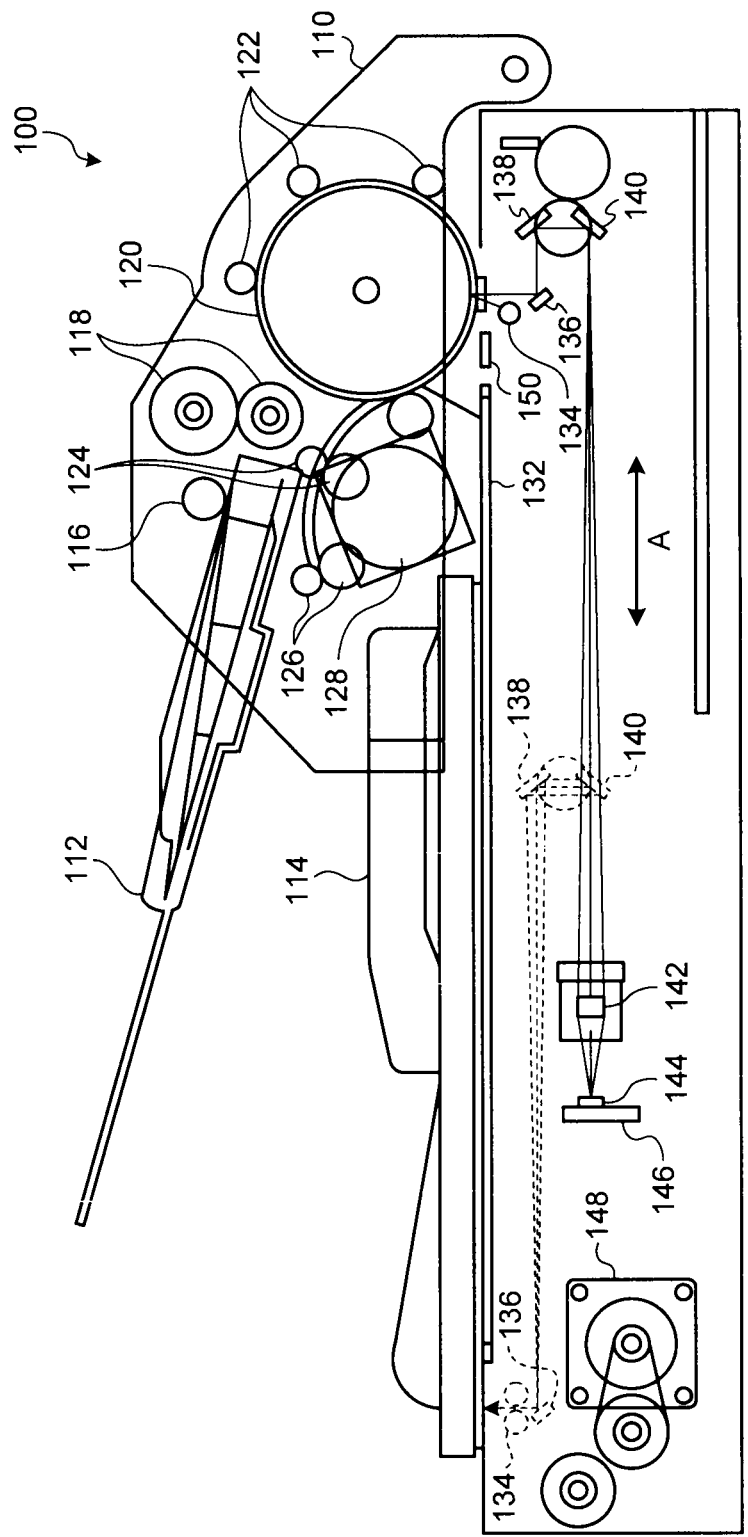
FIG. 1 is a schematic view illustrating an example of an image reading apparatus according to a first embodiment.

FIG. 1 is a schematic view illustrating an example of an image reading apparatus 100 according to the first embodiment. As illustrated in FIG. 1, the image reading apparatus 100 includes an ADF 110 that conveys a document, a document glass plate 132, a lamp 134, a first mirror 136, a second mirror 138, a third mirror 140, a lens 142, a signal processing board 146 on which a charge coupled device (CCD) image sensor 144 is mounted, a driving motor 148, and a reference white plate 150. In the first embodiment, the lamp 134, the first mirror 136, the second mirror 138, the third mirror 140, the lens 142, and the CCD image sensor 144 configure an example of a reading unit according to the present invention. The image reading apparatus 100 is able to read a document by using an ADF reading system in which a document conveyed by the ADF 110 is read or by using a fixed-document reading system in which a document placed on the document glass plate 132 is read.

The ADF 110 includes a document tray 112, a discharge tray 114, a pick-up roller 116, a registration roller pair 118, a conveying drum 120, conveying rollers 122, discharge roller pairs 124 and 126, and a conveyance motor 128.

One or more documents to be read (which is hereafter called a reading target document) are placed on the document tray 112. A document, which is conveyed by the ADF 110 and read by the image reading apparatus 100, is discharged into the discharge tray 114. The pick-up roller 116 picks up the reading target document that is located on the top of the documents placed in the document tray 112. The registration roller pair 118 conveys the reading target document picked up by the pick-up roller 116 to the conveying drum 120 and the conveying roller 122. The conveying drum 120 and the conveying roller 122 convey the reading target document, which has been delivered thereto by the registration roller pair 118, to the discharge roller pairs 124 and 126. The conveying drum 120 is a white roller, i.e., its outer circumference serves as a white reference. The conveying drum 120 is also used for generating correction data for correcting shading data that is generated by using the reference white plate 150, which is to be described later. In the first embodiment, the conveying drum 120 is an example of a first white reference member according to the present invention. The discharge roller pairs 124 and 126 convey the reading target document, which has been conveyed by the conveying drum 120 and the conveying roller 122, to the discharge tray 114. The conveyance motor 128 is the driving source of the conveying drum 120, the conveying roller 122, and the discharge roller pairs 124 and 126. The conveyance motor 128 rotates the rollers and the drum so as to convey a document. The pick-up roller 116 and the registration roller pair 118 are rotated by a sheet feeding motor that is not illustrated in the drawings.

A reading target document is placed on the document glass plate 132. The lamp 134 illuminates a reading target document conveyed by the conveying drum 120 and the conveying roller 122 or a reading target document placed on the document glass plate 132. The first mirror 136 reflects light that is emitted by the lamp 134 and then reflected by the reading target document. The second mirror 138 reflects light that is reflected by the first mirror 136. The third mirror 140 reflects light that is reflected by the second mirror 138. The lamp 134, the first mirror 136, the second mirror 138, and the third mirror 140 function as an optical scanning system. The lens 142 focuses, in a demagnifying manner, the light reflected by the third mirror 140 onto the CCD image sensor 144. The CCD image sensor 144 performs photoelectric conversion on the reflected light that is demagnified and focused by the lens 142 so as to generate image data and then outputs the image data. The signal processing board 146 performs a predetermined process, such as shading correction, on the image data output from the CCD image sensor 144 and externally outputs the processed data. The driving motor 148 is the driving source of the optical scanning system and moves the optical scanning system back and forth in the sub-scanning direction (the direction indicated by the arrow A in FIG. 1). In the example illustrated in FIG. 1, the optical scanning system in motion is represented by the broken lines, and the optical scanning system located in the home position is represented by the solid lines. The reference white plate 150 is used for generating shading data. In the first embodiment, the reference white plate 150 is an example of a second white reference member according to the present invention.

With the ADF reading system, before reading a document, the image reading apparatus 100 moves the optical scanning system to the read position of the reference white plate 150 so as to read white reference data from the reference white plate 150 and then generates shading data by using the read white reference data. Because the reference white plate 150 is a fixed member, the read point of the reference white plate 150 is fixed. Thereafter, the image reading apparatus 100 returns the optical scanning system to the home position (the read position of the ADF reading system) and, while the optical scanning system is stopped, reads the front surface of a reading target document conveyed by the ADF 110. If the image reading apparatus 100 reads a plurality of documents, the image reading apparatus 100 reads, in the sheet interval between successive reading target documents, white data (white reference data in the first sheet interval) from the conveying drum 120 that is located at a position opposed to the optical scanning system. Then, because the conveying drum 120 is driven to rotate, the read point of the conveying drum 120 changes with elapse of time. The image reading apparatus 100 corrects shading data by using the read white reference data and white data, performs shading correction on image data, which is generated by reading a reading target document, by using the corrected shading data, and externally outputs the processed data.

In the fixed-document reading system, before reading a document, the image reading apparatus 100 moves the optical scanning system to the read position of the reference white plate 150 so as to read white reference data from the reference white plate 150 and then generates shading data by using the read white reference data. Thereafter, the image reading apparatus 100 once returns the optical scanning system to the home position, moves the optical scanning system in the sub-scanning direction for scanning, reads the front surface of a reading target document placed on the document glass plate 132, performs shading correction and the like on image data which is generated by reading the reading target document, and then externally outputs the processed data.

Figure 2:
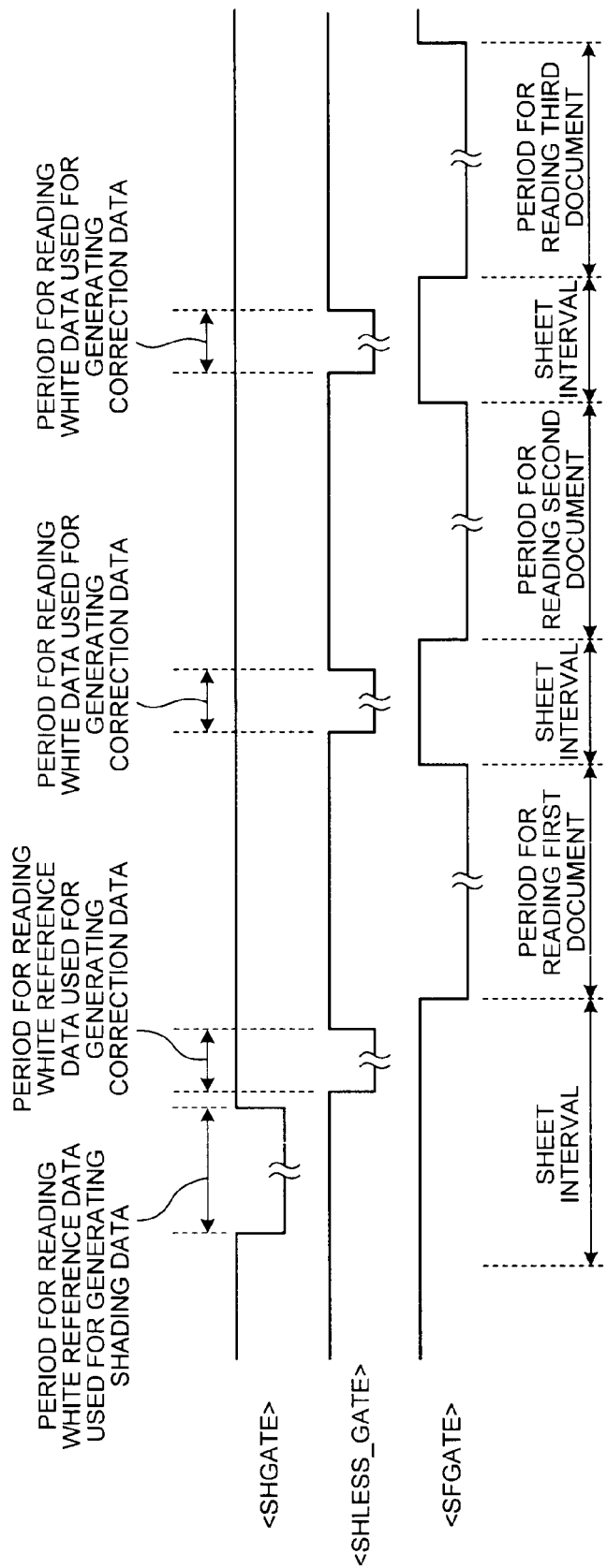
FIG. 2 is a timing chart illustrating an example of an ADF reading operation performed by the image reading apparatus according to the first embodiment.

FIG. 2 is a timing chart illustrating an example of an ADF reading operation performed by the image reading apparatus 100 according to the first embodiment. In the example illustrated in FIG. 2, the sfgate signal is a gate signal that indicates a period during which a document is read, the shgate signal is a gate signal that indicates a period during which white reference data used for generating shading data is read from the reference white plate 150, and the shless_gate signal is a gate signal that indicates a period during which white reference data or white data used for generating correction data is read from the conveying drum 120.

As illustrated in FIG. 2, for reading a plurality of documents by using the ADF reading system, the image reading apparatus 100 reads a document, which is conveyed by the ADF 110, during the "Low" period of the sfgate signal, and performs shading correction, and the like, so as to generate image data. Specifically, as illustrated in FIG. 2, the "High" period of the sfgate signal is a sheet interval for reading documents.

As illustrated in FIG. 2, before reading the first document, the image reading apparatus 100 reads, from the reference white plate 150, white reference data used for generating shading data during the "Low" period (a period in the first sheet interval) of the shgate signal. The image reading apparatus 100 then uses the white reference data read from the reference white plate 150 to generate shading data.

As illustrated in FIG. 2, the image reading apparatus 100 reads, from the conveying drum 120, white reference data used for generating correction data during the first "Low" period (a period in the first sheet interval) of the shless_gate signal after the shgate signal has been negated. The image reading apparatus 100 reads, from the conveying drum 120, white data used for generating correction data during the second and subsequent "Low" periods (periods in the second and subsequent sheet intervals) of the shless_gate signal. Every time the image reading apparatus 100 reads the white data from the conveying drum 120, the image reading apparatus 100 generates correction data by using the read white data and the initially read white reference data and then corrects shading data by using the generated correction data. The corrected shading data is used for shading correction during the first "Low" period (the first period for reading a document after shading data has been corrected) of the sfgate signal after the shading data has been corrected.

It is not necessary to read white reference data used for generating shading data from the reference white plate 150 in the second and subsequent "High" periods (the second and subsequent sheet intervals) of the sfgate signal; therefore, the second and subsequent "High" periods are shorter than the first "High" period (the first sheet interval) of the sfgate signal. The second and subsequent "High" periods (the second and subsequent sheet intervals) of the sfgate signal are shorter than the period of time in which the read point of the conveying drum 120 is returned to a position where the reading unit has started reading the first white reference member, i.e., the period of time in which the conveying drum 120 is rotated by one revolution. The second and subsequent "Low" periods of the shless_gate signal are also shorter than the period of time in which the conveying drum 120 is rotated by one revolution. According to the first embodiment, the first "Low" period of the shless_gate signal is the same as, but not limited thereto, the period of time in which the conveying drum 120 is rotated by one revolution, and may be longer or shorter than the period of time in which the conveying drum 120 is rotated by one revolution.

Figure 3:
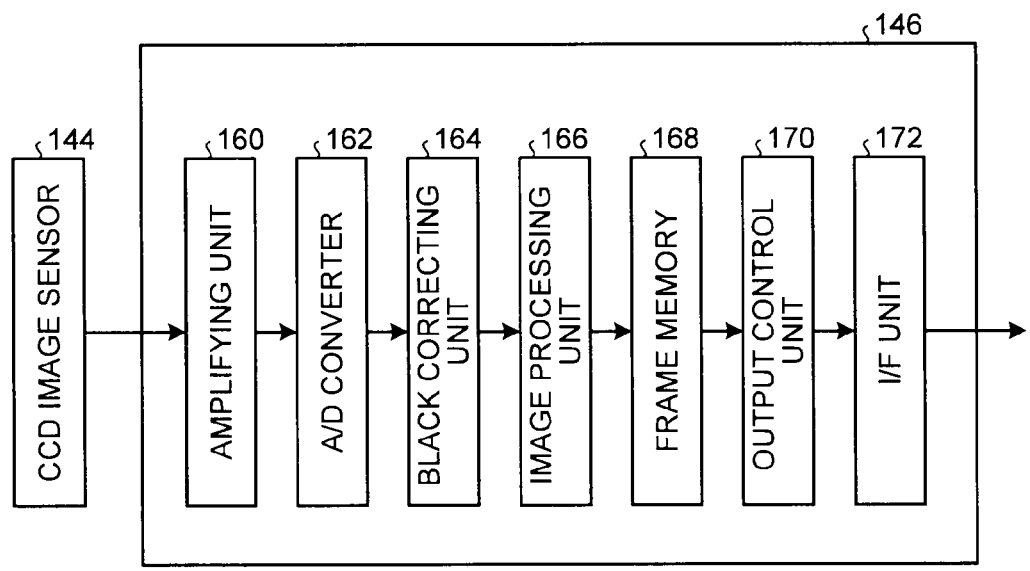
FIG. 3 is a block diagram illustrating an example of the configuration of a signal processing board according to the first embodiment.

FIG. 3 is a block diagram illustrating an example of the configuration of the signal processing board 146 according to the first embodiment. As illustrated in FIG. 3, the signal processing board 146 includes an amplifier 160, an analog-to-digital (A/D) converter 162, a black correcting unit 164, an image processing unit 166, a frame memory 168, an output control unit 170, and an interface (I/F) unit 172.

The amplifier 160 amplifies analog image data (image signals) output from the CCD image sensor 144. The A/D converter 162 converts the analog image data (image signals) amplified by the amplifier 160 into digital image data (image signals). The black correcting unit 164 removes any black-level offset components from the image data converted by the A/D converter 162. The image processing unit 166 performs shading correction, and the like, on the image data from which any black-level offset components have been removed by the black correcting unit 164. The frame memory 168 temporarily stores the image data on which shading correction, and the like, has been performed by the image processing unit 166. The output control unit 170 converts the image data temporarily stored in the frame memory 168 into a data format acceptable to, for example, an image forming apparatus that includes the image reading apparatus 100. The I/F unit 172 outputs, to the image forming apparatus, or the like, the image data with the data format having been converted by the output control unit 170.

Figure 4:
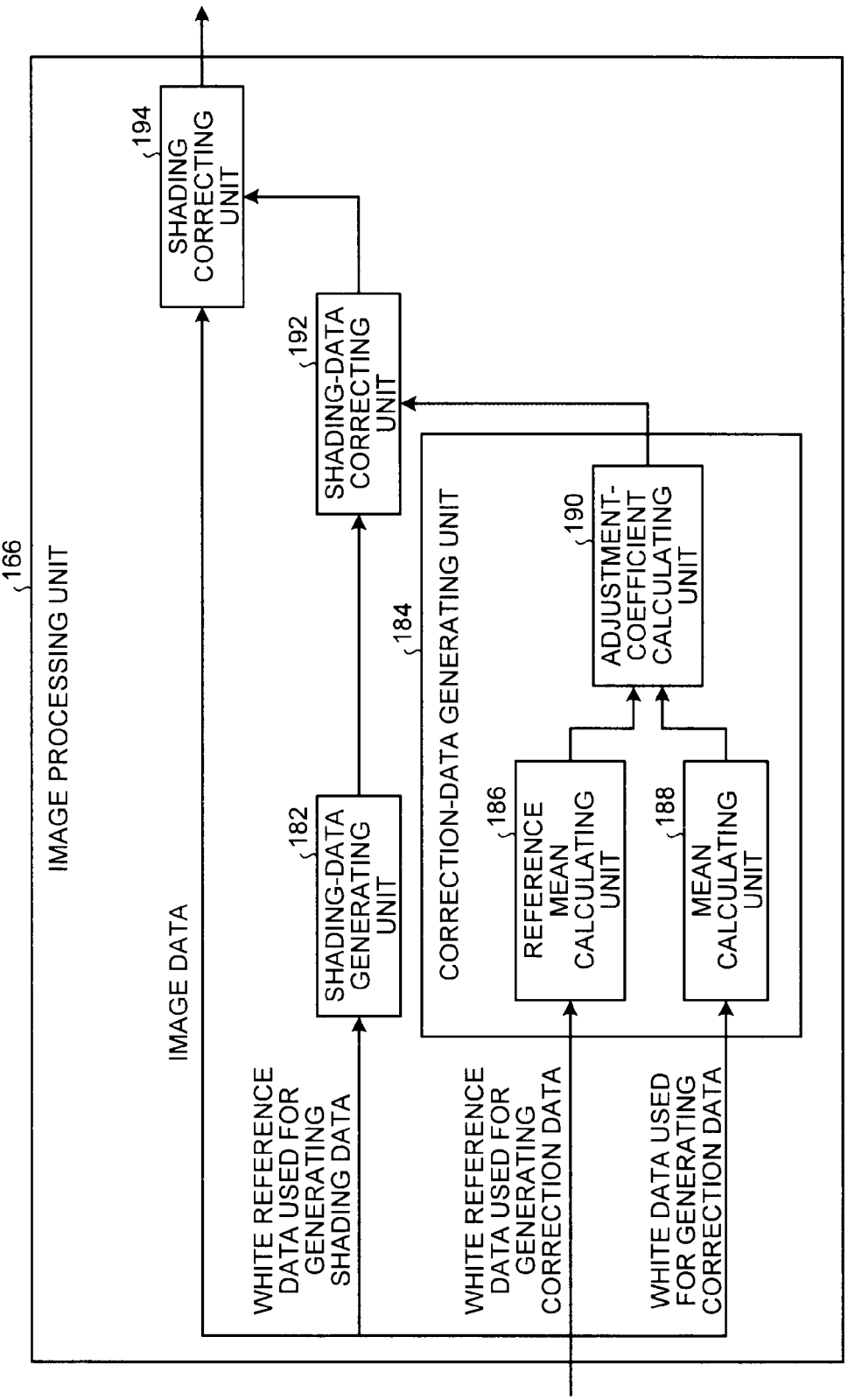
FIG. 4 is a block diagram illustrating an example of the configuration of an image processing unit according to the first embodiment.

FIG. 4 is a block diagram illustrating an example of the configuration of the image processing unit 166 according to the first embodiment. As illustrated in FIG. 4, the image processing unit 166 includes a shading-data generating unit 182, a correction-data generating unit 184, a shading-data correction unit 192, and a shading correction unit 194.

The shading-data generating unit 182 receives image data that is read during the "Low" period of the shgate signal, i.e., white reference data used for generating shading data that is read from the reference white plate 150. The shading-data generating unit 182 generates shading data by using the received white reference data.

The correction-data generating unit 184 generates correction data for correcting shading data, which is generated by the shading-data generating unit 182, in each "High" period of the sfgate signal (specifically, in each of the second and subsequent "High" periods of the sfgate signal), i.e., during each sheet interval (specifically, during each of the second and subsequent sheet intervals). That is, the correction-data generating unit 184 divides, into a matrix of row blocks in a sub scanning direction and column blocks in a main scanning direction, image data that is read during the second and subsequent "Low" periods of the shless_gate signal, i.e., white data used for generating correction data that is read from the conveying drum 120, calculates, for each column of the matrix, a value for the candidate of the correction-data corresponding to the variation ratio in the mean of a plurality of blocks arranged in the sub-scanning direction, and determines a minimum value of the calculated value for the candidate of the correction-data as the correction data. The correction-data generating unit 184 includes a reference mean calculation unit 186, a mean calculation unit 188, and an adjustment-coefficient calculation unit 190.

The reference mean calculation unit 186 receives image data that is read during the first "Low" period of the shless_gate signal, i.e., white reference data used for generating correction data that is read from the conveying drum 120. The reference mean calculation unit 186 divides the received white reference data into a matrix of row blocks in a sub scanning direction and column blocks in a main scanning direction and calculates, for each column of the matrix, the reference mean of the blocks that are arranged in the sub-scanning direction.

Figure 5:
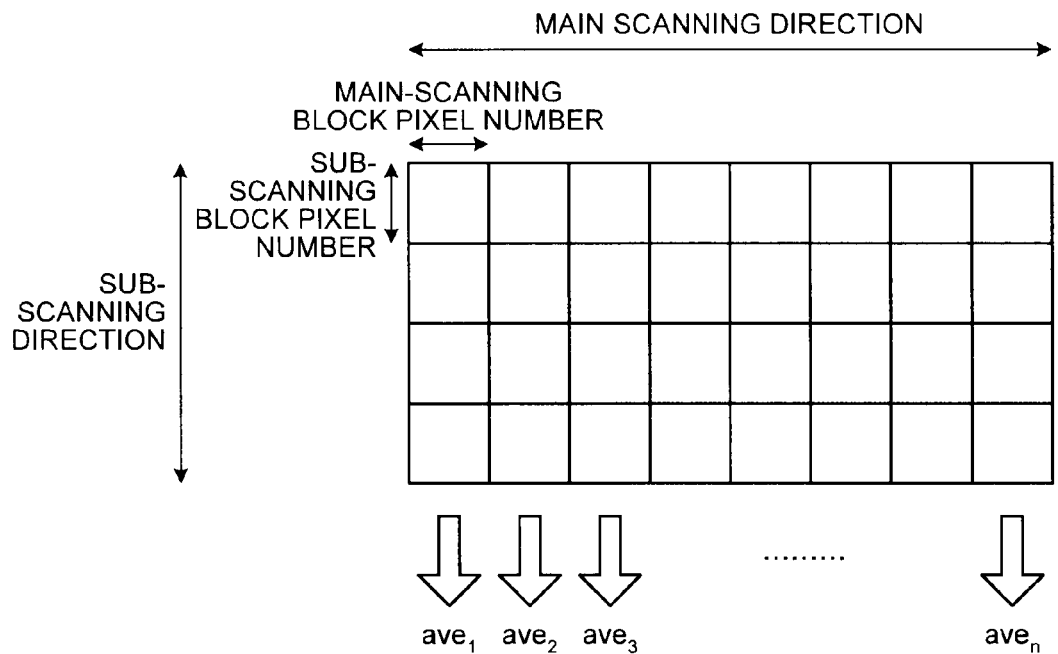
FIG. 5 is an explanatory diagram illustrating an example of a method for calculating a reference mean.

FIG. 5 is an explanatory diagram illustrating an example of a method for calculating a reference mean. As illustrated in FIG. 5, the reference mean calculation unit 186 divides input white reference data into a plurality of blocks in accordance with the arbitrarily designated main-scanning block pixel number and sub-scanning block pixel number and calculates the value of the white reference data in each block. In the example illustrated in FIG. 5, the white reference data is divided into n number (n is a positive number equal to or larger than two) of blocks in the main scanning direction. The reference mean calculation unit 186 calculates, for each column of the matrix made by dividing the white reference data also in the sub-scanning direction, the maximum value of a plurality of the values in the blocks arranged in the sub-scanning direction and stores the maximum values thus obtained in a memory (not illustrated) as the reference means $ave_1$, $ave_2$, $ave_3$, ... $ave_n$. In order to reduce the effect of any dirt that adheres to the outer circumference area of the conveying drum 120, the maximum value of a plurality of the values of the blocks arranged in the sub-scanning direction is determined as the reference mean.

The mean calculation unit 188 receives image data that is read during the second and subsequent "Low" periods of the shless_gate signal, i.e., white data used for generating correction data that is read from the conveying drum 120. In the same manner as the reference mean calculation unit 186, the mean calculation unit 188 divides the received white data into a matrix of row blocks in a sub scanning direction and column blocks in a main scanning direction and calculates, for each column of the matrix, the mean of the blocks arranged in the sub-scanning direction.

Figure 6:
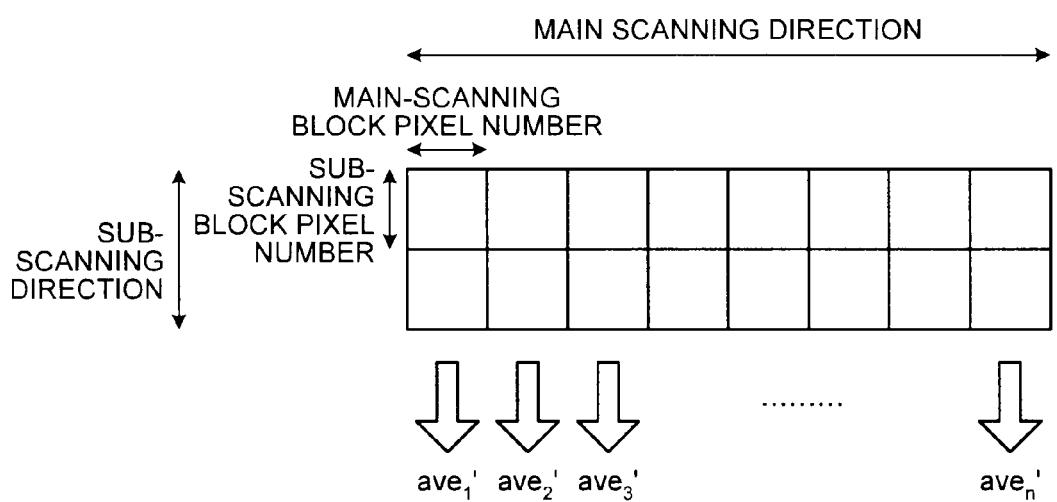
FIG. 6 is an explanatory diagram illustrating an example of a method for calculating a mean.

FIG. 6 is an explanatory diagram illustrating an example of a method for calculating the mean. As illustrated in FIG. 6, the mean calculation unit 188 divides input white data into a plurality of blocks in accordance with the main-scanning block pixel number and the sub-scanning block pixel number and calculates the value of the white data in each block. In the example illustrated in FIG. 6, the white data is divided into n number of blocks in the main scanning direction. The mean calculation unit 188 calculates, for each column of the matrix made by dividing the white data also in the sub-scanning direction, the maximum value of a plurality of the values of the blocks arranged in the sub-scanning direction and stores the maximum values thus obtained in a memory (not illustrated) as the means $ave_1'$, $ave_2'$, $ave_3'$, ... $ave_n'$. In order to reduce the effect of any dirt that adheres to the outer circumference area of the conveying drum 120, the maximum value of a plurality of the values of the blocks arranged in the sub-scanning direction is determined as the mean.

The adjustment-coefficient calculation unit 190 calculates, for each column of the blocks, a shading output-level adjustment candidate coefficient (an example of a correction-data candidate value) in accordance with the variation ratio of the reference mean calculated by the reference mean calculation unit 186 to the mean calculated by the mean calculation unit 188. The adjustment-coefficient calculation unit 190 sets a minimum value of the calculated shading output-level adjustment candidate coefficients as the shading output-level adjustment coefficient (an example of correction data). Specifically, the adjustment-coefficient calculation unit 190 calculates the shading output-level adjustment candidate coefficient according to the equation (1).

$$shlvlless_i = sh\_lvl \times ave_i / ave_i' \quad (1 \leq i \leq n) \tag{1}$$

The shading output-level adjustment candidate coefficient, for each column of the blocks, is denoted by $shlvlless_i$, and the initial value of the shading output-level adjustment coefficient is denoted by sh_lvl.

As seen in the equation (2), the adjustment-coefficient calculation unit 190 sets a minimum value of a plurality of the shading output-level adjustment candidate coefficients, calculated by using the equation (1), as the shading output-level adjustment coefficient.

$$shlvlcal = shlvlless_{min} \tag{2}$$

The shading output-level adjustment coefficient is denoted by shlvlcal, and the minimum value of $shlvlless_i$ is denoted by $shlvlless_{min}$.

Any dirt or variation in white density on the outer circumference area of the conveying drum 120 causes an increase in the value of the ratio $ave_i/ave_i'$; in order to minimize any effect resulting therefrom, the adjustment-coefficient calculation unit 190 sets $shlvlless_{min}$ as the shading output-level adjustment coefficient.

The shading-data correction unit 192 corrects shading data generated by the shading-data generating unit 182 by using the correction data generated by the correction-data generating unit 184.

The shading correction on image data is generally performed with a calculation according to equation (3); therefore, the shading-data correction unit 192 calculates $1/(D_{sh}-B_k) \times shlvlcal$ to correct shading data.

$$D_{out} = (D_{in} - B_k)/(D_{sh} - B_k) \times shlvlcal \tag{3}$$

Here, $D_{out}$ denotes an image data on which the shading correction has been performed, $D_{in}$ denotes the image data on which the shading correction has not been performed, $D_{sh}$ denotes the shading data, and $B_k$ denotes a black level (an image data level obtained when there is no incoming light).

The shading correction unit 194 receives image data that is read during the "Low" period of the sfgate signal, i.e., image data on a document. The shading correction unit 194 uses the shading data corrected by the shading-data correction unit 192 to perform shading correction on input image data, i.e., image data on a document that is read after correction data is generated. Specifically, the shading correction unit 194 performs, in the calculation according to equation (3), division of $(D_{in}-B_k)$ by the calculation result obtained by the shading-data correction unit 192.

Figure 7:
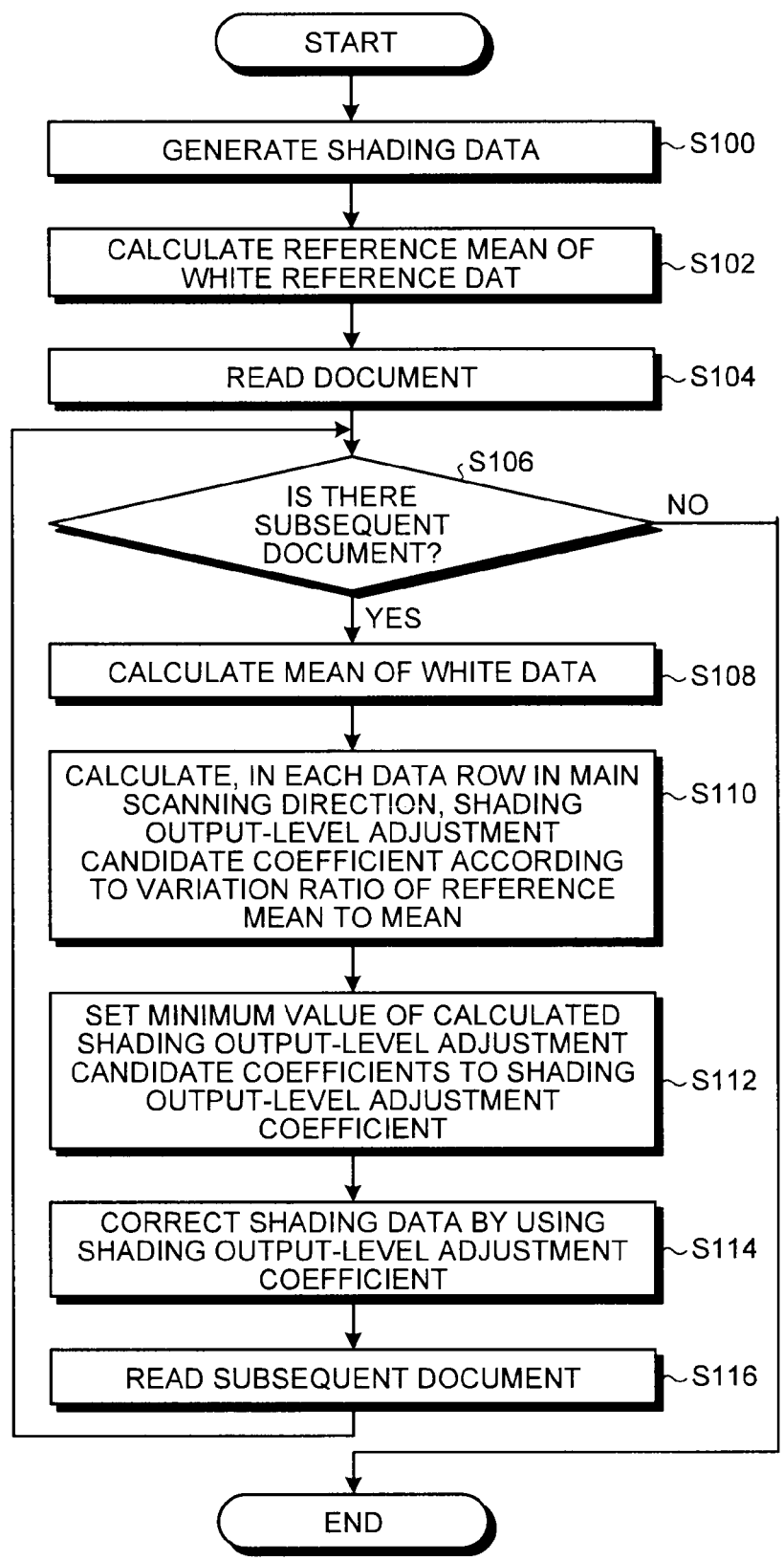
FIG. 7 is a flowchart illustrating an example of the procedure for a shading correction performed by the image reading apparatus according to the first embodiment.

FIG. 7 is a flowchart illustrating an example of the procedure of a shading correction process performed by the image reading apparatus 100 according to the first embodiment.

First, the shading-data generating unit 182 generates shading data by using the white reference data that is read from the reference white plate 150 (step S100).

Next, the reference mean calculation unit 186 divides the white reference data that is read from the conveying drum 120 into a plurality of blocks and calculates, for each column of the blocks, the reference mean of the blocks arranged in the sub-scanning direction (step S102).

Then, the image reading apparatus 100 reads the first document to generate image data, performs shading correction, and the like, using shading data generated by the shading-data generating unit 182, on the image data, and externally outputs the processed data (step S104).

If there is a subsequent document (the second sheet and subsequent sheets of the document) (Yes at step S106), the mean calculation unit 188 divides the white data that is read from the conveying drum 120 into a plurality of blocks and calculates, for each column of the blocks, the mean of the blocks arranged in the sub-scanning direction (step S108).

The adjustment-coefficient calculation unit 190 then calculates, for each column of the blocks, a shading output-level adjustment candidate coefficient according to the variation ratio of the reference mean calculated by the reference mean calculation unit 186 to the mean calculated by the mean calculation unit 188 (step S110).

The adjustment-coefficient calculation unit 190 then sets a minimum value of the calculated shading output-level adjustment candidate coefficients as the shading output-level adjustment coefficient (step S112).

The shading-data correction unit 192 then corrects shading data generated by the shading-data generating unit 182 by using the shading output-level adjustment coefficient calculated by the adjustment-coefficient calculation unit 190 (step S114).

The image reading apparatus 100 then reads the next document, performs shading correction, and the like, by using shading data corrected by the shading-data correction unit 192 on image data that is generated by reading the document, and externally outputs the processed data (step S116).

Then, the processing returns to step S106, and the image reading apparatus 100 performs the processes from step S108 to step S116 until there is no subsequent document to be processed. If there is no subsequent document (No at step S106), the process ends.

As described above, according to the first embodiment, correction data is generated in a time period shorter than the actual sheet interval and is generated by using data, out of white data read within this time period, on the area with the least effect of dirt or density variation. Therefore, in the first embodiment, it is possible to perform shading correction at low cost, with a reduced effect of dirt, and without a decrease in image data productivity.

Second Embodiment

An explanation is given of shading correction according to a second embodiment where a white reference member is commonly used for generating shading data and for generating correction data. The second embodiment uses, as an example, an image reading apparatus that includes a backside reading mechanism that reads the back side of a document. An ADF is used, as an example, to describe the image reading apparatus according to the second embodiment. An explanation is mainly given below of the differences between the first embodiment and the second embodiment. The elements having the same functions as those in the first embodiment are given the same names and reference numerals, and the explanations thereof are omitted.

Figure 8:
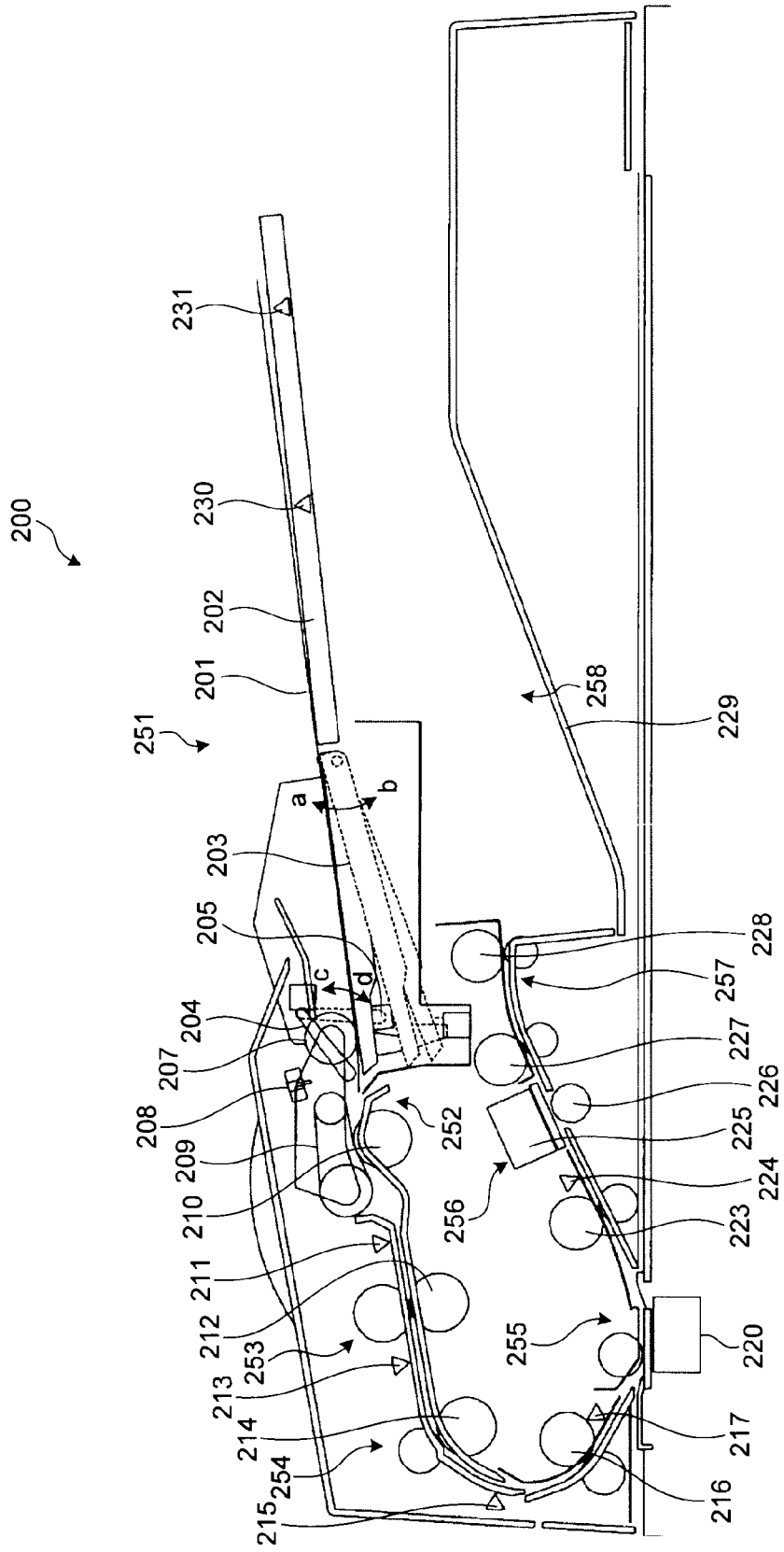
FIG. 8 is a schematic diagram illustrating an example of an image reading apparatus according to a second embodiment.
Figure 9:
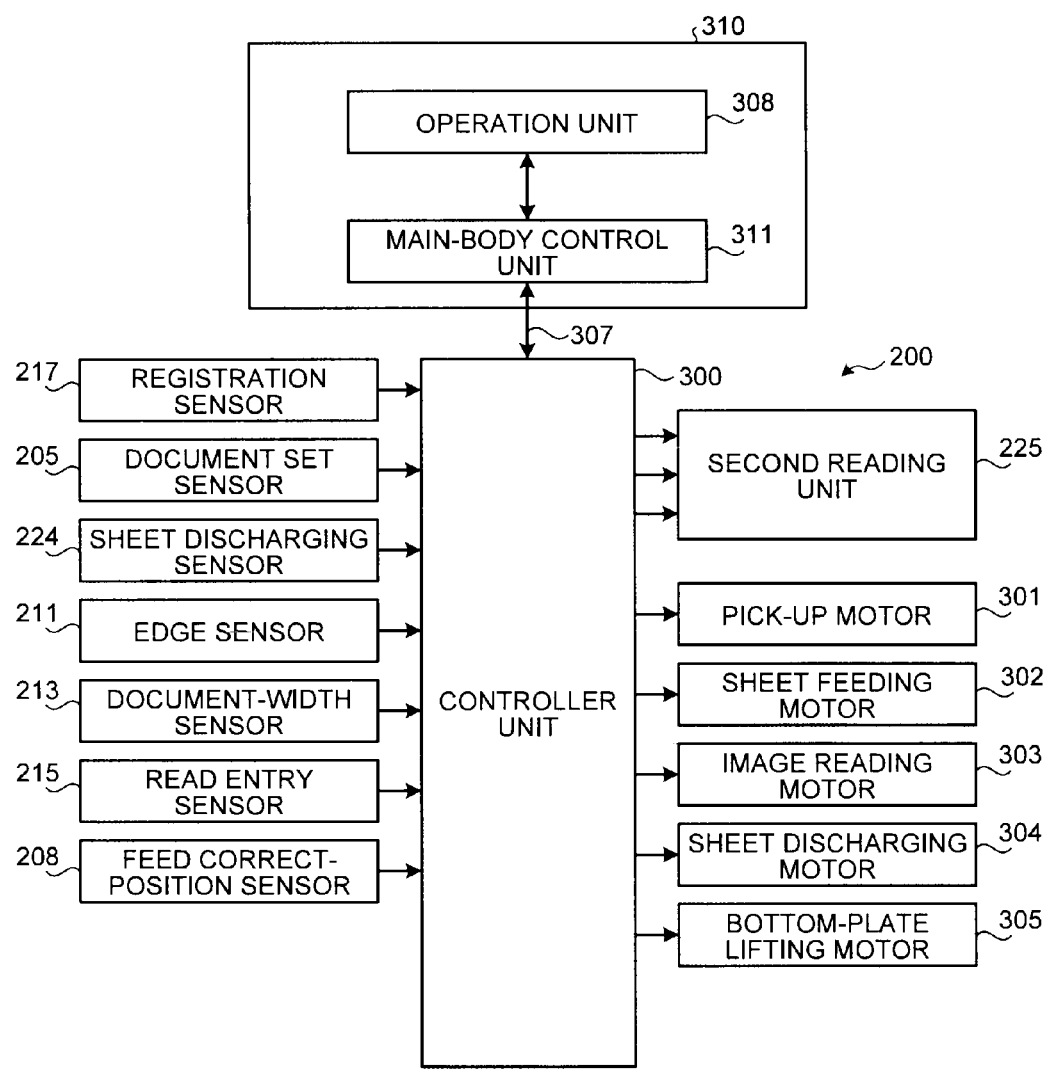
FIG. 9 is a block diagram illustrating an example of the configuration of the image reading apparatus according to the second embodiment.

FIG. 8 is a schematic diagram illustrating an example of an image reading apparatus 200 according to the second embodiment. FIG. 9 is a block diagram illustrating an example of the configuration of the image reading apparatus 200 according to the second embodiment. As illustrated in FIGS. 8 and 9, the image reading apparatus 200 includes a document setting section 251, a separation-and-feeding section 252, a registration section 253, a reverse section 254, a first reading conveyance section 255, a second reading conveyance section 256, a discharge section 257, a stacking section 258, a drive unit that includes a pick-up motor 301, a sheet feeding motor 302, an image reading motor 303, a sheet discharging motor 304 and a bottom-plate lifting motor 305, and a controller unit 300. A bundle of documents to be read is set on the document setting section 251. The separation-and-feeding section 252 separates a document from the bundle of set documents one sheet at a time and feeds the document. The registration section 253 abuts to align the fed document, for the first time, and pulls out the aligned document to be conveyed. The reverse section 254 turns over the conveyed document so as to convey the document so that the image side thereof faces toward the read side (downward). The first reading conveyance section 255 causes images on the front surface of the document to be read from beneath the contact glass. The second reading conveyance section 256 causes images on the back surface of the document to be read after the front surface has been read. The discharge section 257 discharges, to an outside of the apparatus, the document after the front and back surfaces have been read. The documents for which the reading process has been completed are stacked and held in the stacking section 258. The drive unit that includes the pick-up motor 301 to the bottom-plate lifting motor 305 drives the conveying operations described above. The controller unit 300 controls a sequence of the operations.

A bundle of documents 201 for which the reading process is to be performed is set on a document table 202 that includes a movable document table 203 such that the image side of each of the documents faces upward. The position of the bundle of documents 201 in the width direction (the direction perpendicular to the sheet conveying direction) is determined by a side guide (not illustrated). The set document is detected by a set filler 204 and a document set sensor 205. A signal indicating that the document has been detected is transmitted to a main-body control unit 311 of an apparatus main body 310 via an I/F 307 (see FIG. 9). A document-length detection sensor 230 or 231 that is located on the surface of the document table 202 determines the approximate length of a document in the sheet conveying direction. For the document-length detection sensor 230 or 231, a reflective sensor or an actuator-type sensor that can detect even one sheet of a document is used. It is necessary to arrange a sensor that can determine at least whether a document of the same size is set lengthwise or widthwise.

A configuration is such that the movable document table 203 can be moved up and down by the bottom-plate lifting motor 305 (see FIG. 9) in the directions indicated by the arrows a and b in FIG. 8. If the set filler 204 and the document set sensor 205 detect that a document is set, the bottom-plate lifting motor 305 is rotated in a normal direction so that the movable document table 203 is lifted up so that the top surface of the bundle of documents 201 is brought into contact with a pick-up roller 207. The pick-up roller 207 is moved in the directions indicated by the arrows c and d in FIG. 8 by a cam mechanism using the pick-up motor 301 (see FIG. 9). When the movable document table 203 is lifted up, the pick-up roller 207 is moved up in the direction c because it is pushed by the document placed on the movable document table 203. A correct sheet feed position sensor 208 detects the upper limit on the position that the pick-up roller 207 can take.

When the print key on an operation unit 308 of the apparatus main body 310 is pressed (see FIG. 9) so that the main-body control unit 311 of the apparatus main body 310 transmits, via the I/F 307, a document feed signal to the controller unit 300 of the ADF, a sheet feeding motor 302 is rotated in a normal direction so that the pick-up roller 207 is rotated. The pick-up roller 207 then picks up several sheets (ideally, one sheet) of documents placed on the document table 202.

Next, a feed belt 209 is driven to rotate in the sheet-feeding direction due to the normal rotation of the sheet feeding motor 302. A reverse roller 210 is driven to rotate in the opposite direction to the sheet-feeding direction due to the normal rotation of the sheet feeding motor 302 so as to separate a sheet of the document on the top of the stack from other sheets of the documents under the top sheet of the document and feed only the top sheet of the document.

When the reverse roller 210 is in contact with the feed belt 209 with predetermined pressure or with one sheet of the document interposed therebetween, the reverse roller 210 is rotated in the counterclockwise direction in accordance with the rotation of the feed belt 209. Even if two or more sheets of the document are interposed between the feed belt 209 and the reverse roller 210, an operation for pushing back an unnecessary sheet of the document is performed so that feeding of a plurality of documents is avoided.

A sheet of the document, which is separated from other sheets as described above, is further delivered by the feed belt 209 and, after the leading edge of a sheet of the document is detected by an edge sensor 211, the sheet of the document abuts on a pull-out roller 212 that is being stopped. The document is then conveyed for a predetermined distance after the detection of the edge sensor 211 and is abutted against the pull-out roller 212 with a predetermined amount of bending. The driving of the feed belt 209 is stopped in the above state.

Next, when the pick-up roller 207 is separated from the top surface of the document and the feed belt 209 conveys the document, the leading edge of the document enters the nip between the upper and lower pull-out rollers 212. Here, alignment (skew correction) is performed on the leading edge of the document. The pull-out rollers 212 convey the document, on which the skew correction has been performed, to an intermediate roller 214.

A plurality of document-width sensors 213 is arranged in the direction of the depth in FIG. 8 to detect the size of the document, which is conveyed by the pull-out roller 212, in the width direction that is perpendicular to the sheet conveying direction. The length of the document in the sheet conveying direction is detected, through motor pulses, by the edge sensor 211 that reads the leading edge and trailing edge of the sheet of the document. When the pull-out roller 212 and the intermediate roller 214 are driven to convey the document from the registration section 253 to the reverse section 254, the conveying speed in the registration section 253 is set to be larger than that in the first reading conveyance section 255. Thus, the processing time to deliver a document to a reading unit can be shortened.

When the leading edge of the document is detected by a read entry sensor 215, the controller unit 300 starts to decrease the document conveying speed so that the document conveying speed coincides with the read conveying speed before the leading edge of the document enters the nip between a pair of upper and lower read entry rollers 216. At the same time, the controller unit 300 drives an image reading motor 303 in a normal direction so as to drive the read entry roller 216, a read exit roller 223, and a CIS exit roller 227.

When a registration sensor 217 detects the leading edge of the sheet of the document, the controller unit 300 decreases the document conveying speed over a predetermined conveying distance and temporarily stops conveying the sheet of the document immediately before arriving at a first reading unit 220. The controller unit 300 transmits a registration stop signal to the main-body control unit 311 via the I/F 307.

Upon receiving a read start signal from the main-body control unit 311, the controller unit 300 causes the document, which is being stopped for registration, to be conveyed at an increased conveying speed so that the conveying speed of the sheet of the document reaches a predetermined conveying speed before the leading edge of the sheet of the document arrives at the read position.

At a timing when the leading edge of the sheet of the document, which is detected by using the pulse count of the image reading motor 303, reaches the first reading unit 220, the controller unit 300 transmits to the main-body control unit 311 a gate signal that indicates an effective image area of a first surface in the sub-scanning direction. The gate signal is transmitted until the trailing edge of the document passes through the first reading unit 220.

For reading of a one-sided sheet of a document, the sheet of the document passes through the first reading conveyance section 255 and then a second reading unit 225 and is then conveyed to the discharge section 257. Then, if a discharge sensor 224 detects the leading edge of the document, the controller unit 300 drives a discharge motor 304 in a normal direction so as to rotate a discharge roller 228 in the counter-clockwise direction. By using a discharge-motor pulse count by the discharge sensor 224 that detects the leading edge of the sheet of the document, the controller unit 300 decreases the discharge-motor driving speed just before the trailing edge of the document passes through the nip between the pair of upper and lower discharge rollers 228 so that the discharged sheet of the document will not pop into a discharge tray 229.

A second read roller 226 is located in opposing to the second reading unit 225 so as to suppress the floating of a sheet of the document in the second reading unit 225. The second read roller 226 is a white roller, i.e., its outer circumference serves as a white reference. The second read roller 226 is used for generating shading data and also used for generating correction data for correcting shading data. That is, in the second embodiment, the second read roller 226 is an example of the first white reference member according to the present invention.

For reading of a two-sided sheet of a document, before reading a sheet of the document, the second reading unit 225 reads white reference data used for generating shading data from the second read roller 226 and, by using the read white reference data, generates shading data. The second reading unit 225 also reads white reference data used for generating correction data from the second read roller 226. Thereafter, by using the pulse count of the image reading motor 303 after the detection of the leading edge of the sheet of the document by the discharge sensor 224, when the leading edge of the sheet of the document reaches the second reading unit 225, the controller unit 300 transmits to the second reading unit 225 a gate signal that indicates an effective image area in the sub-scanning direction. The gate signal is transmitted until the trailing edge of the document passes through the second reading unit 225. The second reading unit 225 reads the back surface of a reading target document while the gate signal is transmitted. To read a plurality of documents, the second reading unit 225 reads white data from the second read roller 226 during a sheet interval of reading target document. Then, because the second read roller 226 is driven to rotate, the read point of the second read roller 226 changes with time. The second reading unit 225 uses the white reference data used for generating correction data and white data to correct shading data and, by using the corrected shading data, performs shading correction, and the like, on image data, which is generated by reading the reading target document, and externally outputs the processed data.

Figure 10:
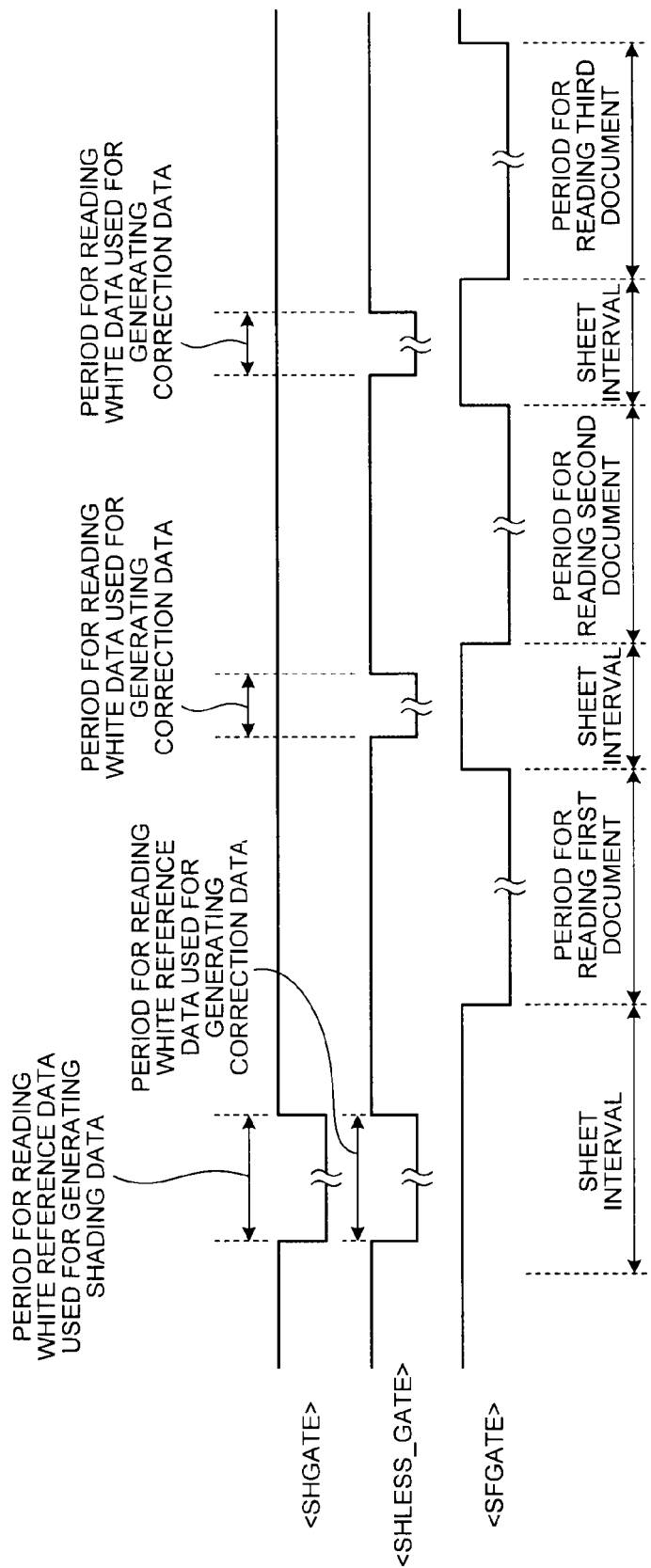
FIG. 10 is a timing chart illustrating an example of a reading operation performed by the image reading apparatus according to the second embodiment.

FIG. 10 is a timing chart illustrating an example of a reading operation performed by the image reading apparatus 200 according to the second embodiment. In the example illustrated in FIG. 10, the sfgate signal is a gate signal that indicates a period during which a document is read, the shgate signal is a gate signal that indicates a period during which white reference data used for generating shading data is read from the second read roller 226, and the shless_gate signal is a gate signal that indicates a period during which one of white reference data used for generating correction data and white data is read from the second read roller 226.

The second embodiment is similar to the first embodiment except that the second read roller 226 is used instead of the reference white plate 150 and the conveying drum 120, the "Low" period of the shgate signal and the first "Low" period of the shless_gate signal are asserted simultaneously, and the reading of white reference data used for generating shading data and the reading of white reference data used for generating correction data are performed at the same time. Therefore, a detailed explanation is omitted for the timing chart illustrated in FIG. 10.

Figure 11:
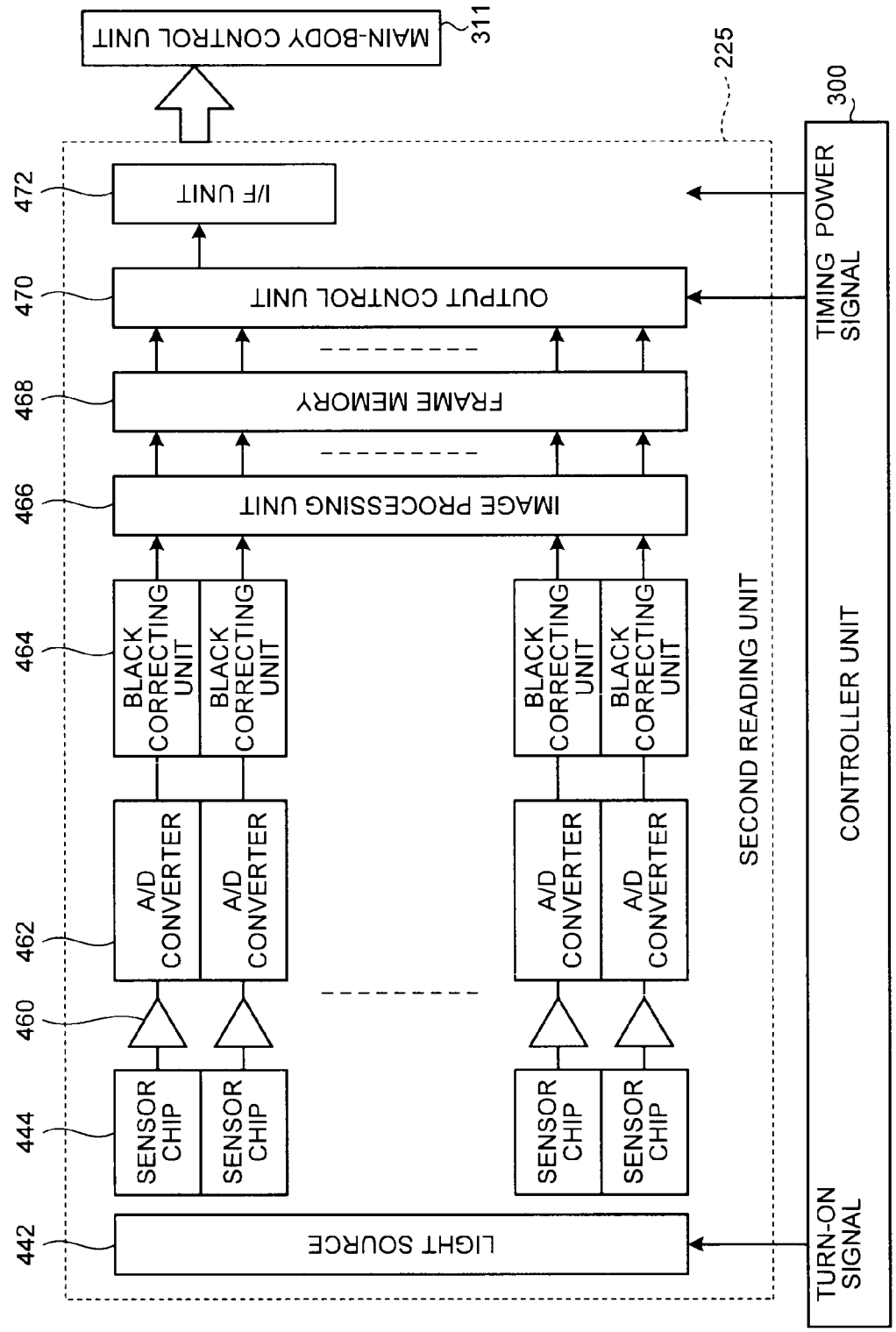
FIG. 11 is a block diagram illustrating an example of the configuration of a second reading unit according to the second embodiment.

FIG. 11 is a block diagram illustrating an example of the configuration of the second reading unit 225 according to the second embodiment. As illustrated in FIG. 11, the second reading unit 225 includes a light source unit 442, a plurality of sensor chips 444, a plurality of amplifiers 460, a plurality of A/D converters 462, a plurality of black correcting units 464, an image processing unit 466, a frame memory 468, an output control unit 470, and an I/F unit 472. In the second embodiment, the light source unit 442 and the sensor chips 444 are an example of a reading unit according to the present invention.

The light source unit 442 can be configured by using a light-emitting diode (LED) array, fluorescent light, cold-cathode tube, or the like. The light source unit 442 is turned on by using the turn-on signal that is transmitted from the controller unit 300 before a sheet of a document enters the read position of the second reading unit 225.

The plurality of sensor chips 444 can be configured by using photoelectric conversion elements and collecting lenses that are referred to as equal-magnification contact image sensors. The plurality of sensor chips 444 are arranged in the main scanning direction (the direction corresponding to the width direction of a document) so as to collect light emitted by the light source unit 442 and reflected by a sheet of a document and read the light as image data.

The amplifier 460 is arranged for each of the sensor chips 444 and amplifies analog image data (image signals) that is output from the sensor chip 444. The A/D converter 462 is arranged for each of the amplifiers 460 and converts the analog image data (image signals), which has been amplified by the amplifier 460, into digital image data (image signals). The black correcting unit 464 is arranged for each of the A/D converters 462 and removes a black-level offset component from the image data having been converted by the A/D converter 462. The image processing unit 466 performs shading correction, and the like, on the image data from which a black-level offset component has been removed by the black correcting unit 464. Because the configuration of the image processing unit 466 according to the second embodiment is similar to that of the image processing unit 166 according to the first embodiment, its detailed explanation is omitted. The frame memory 468 temporarily stores image data on which shading correction, and the like, has been performed by the image processing unit 466. The output control unit 470 converts the image data temporarily stored in the frame memory 468 into a data format acceptable to the main-body control unit 311, or the like. The I/F unit 472 outputs to the main-body control unit 311, or the like, the image data whose data format has been converted by the output control unit 470.

The controller unit 300 outputs a timing signal used for notifying a timing at which the leading edge of a sheet of a document reaches the read position of the second reading unit 225, a turn-on signal of a light source, a power, or the like. Image data that is obtained after the timing is treated as effective data.

Figure 12:
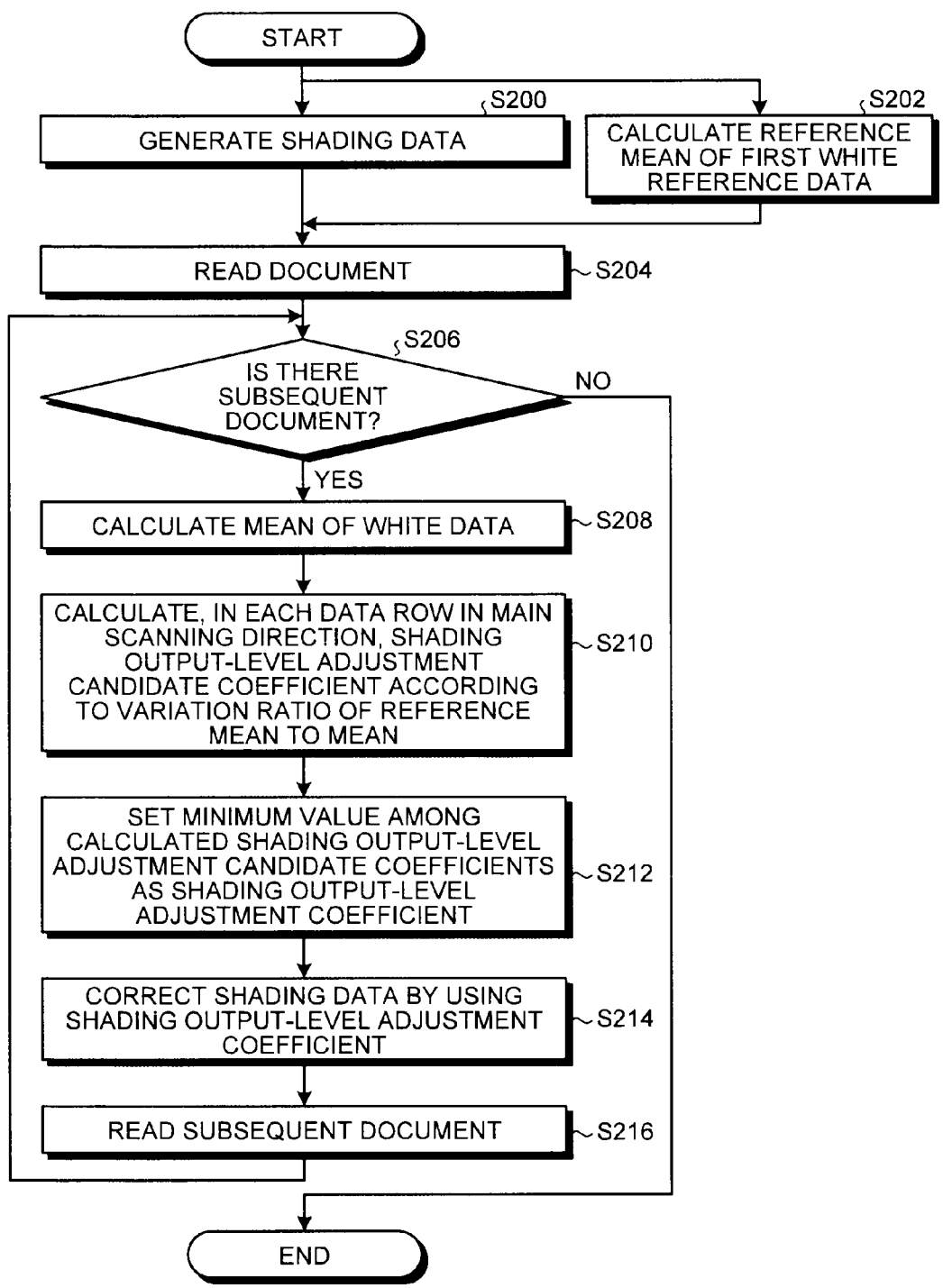
FIG. 12 is a flowchart illustrating an example of a shading correction process performed by the image reading apparatus according to the second embodiment.

FIG. 12 is a flowchart illustrating an example of the procedure of a shading correction process performed by the image reading apparatus 200 according to the second embodiment.

The second embodiment is similar to the first embodiment except that the reference white plate 150 and the conveying drum 120 are replaced by the second read roller 226 and the generation of shading data at step S200 and the calculation of a reference mean at step S202 are performed simultaneously. Specifically, the processes from step S204 to step S216 are similar to the processes from step S104 to step S116 in the flowchart illustrated in FIG. 7. Therefore, a detailed explanation is omitted of the flowchart illustrated in FIG. 12.

According to the second embodiment, similarly to the first embodiment as described above, shading correction can be performed at low cost, with a reduced effect of dirt, and without a decrease in image data productivity.

According to the second embodiment, in particular, because the same member is commonly used as the white reference member used for generating shading data and as the white reference member used for generating correction data, it becomes unnecessary to move the reading unit; thus, image data productivity can be improved. Furthermore, because white reference data used for generating shading data and white reference data used for generating correction data can be generated at once, a variation factor due to an elapse of time can be reduced; thus, accuracy of correction can be improved.

MODIFIED EXAMPLES

The present invention is not limited to the above-described embodiments, and various modifications are possible. For example, the above-described embodiments may be combined to configure a modification.

First Modified Example

In each of the above-described embodiments, the correction-data generating unit 184 may include the minimum value of the correction-data candidate values in the previous correction data at a predetermined ratio so as to obtain correction data. Here, an explanation is given of a case where a modification is applied to the image reading apparatus 200 according to the second embodiment.

Figure 13:
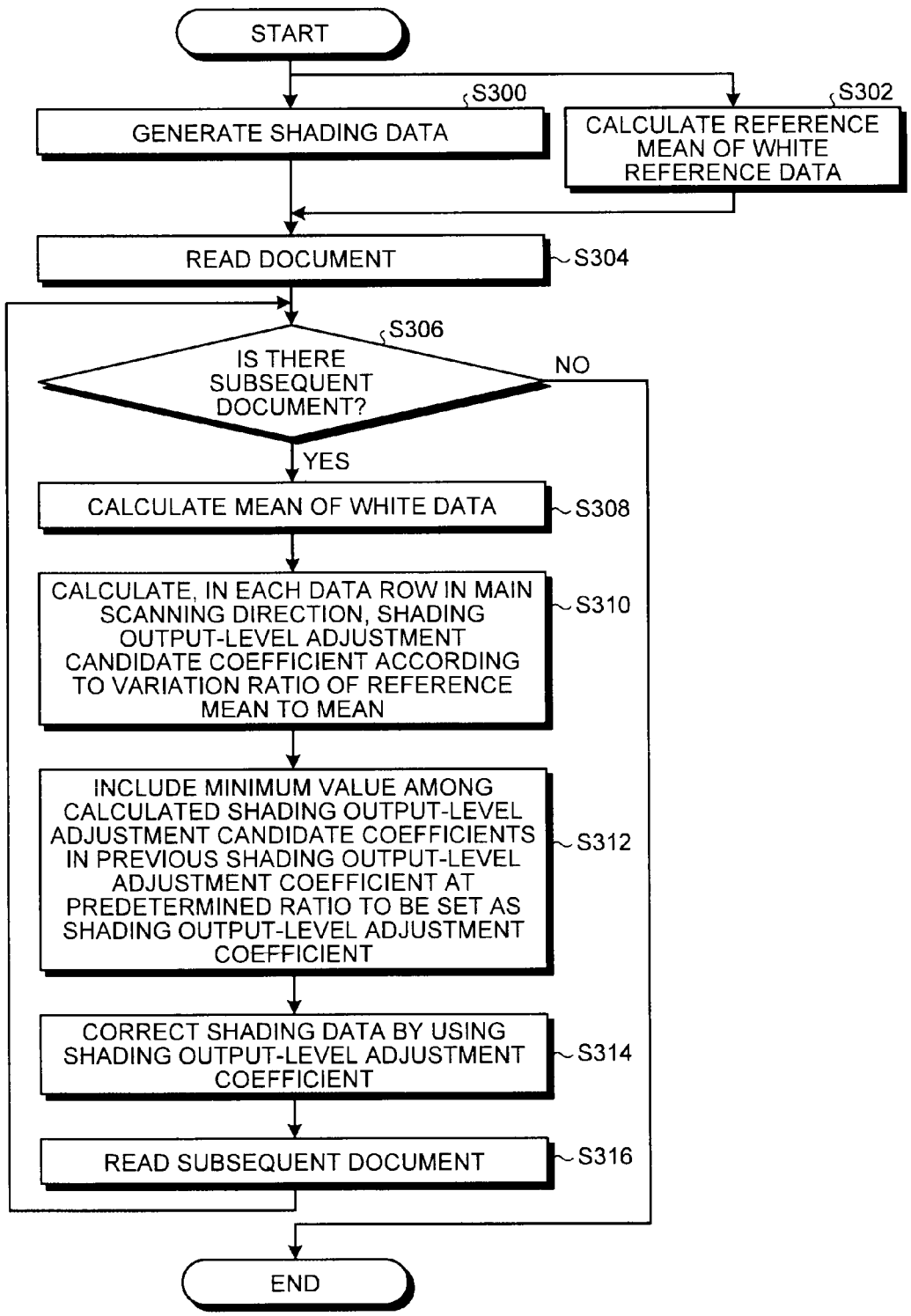
FIG. 13 is a flowchart illustrating an example of a shading correction process performed by the image reading apparatus according to a first modified example.

FIG. 13 is a flowchart illustrating an example of the procedure of a shading correction process performed by the image reading apparatus 200 according to the first modified example.

The processes from step S300 to step S310 are similar to the processes from step S200 to step S210 in the flowchart illustrated in FIG. 12. However, in the image reading apparatus 200 according to the first modified example, after step S306, the adjustment-coefficient calculation unit 190 sets the initial value in the shading output-level adjustment coefficient by using the equation (4).

$$shlvlcal = sh\_lvl \quad (4)$$

Then, the adjustment-coefficient calculation unit 190 includes the minimum value of the calculated shading output-level adjustment candidate coefficients in the previous shading output-level adjustment coefficient at a predetermined ratio so as to set the shading output-level adjustment coefficient (step S312). Specifically, the adjustment-coefficient calculation unit 190 sets the shading output-level adjustment coefficient by using the equation (5).

$$shlvlcal = shlvlcal - (shlvlcal - shlvlless_{min}) \times lesslvl \quad (5)$$

The inclusion ratio is denoted by lesslvl.

The processes from step S314 to step S316 are similar to the processes from step S214 to step S216 in the flowchart illustrated in FIG. 12.

If correction data is generated by using the background of the read position, accuracy of correction may be destabilized due to dirt or density difference; however, if correction data is obtained by including the minimum value of the correction-data candidate values in the previous correction data at a predetermined ratio, it is possible to obtain a result with a reduced effect of a variation factor and to improve the accuracy of correction.

Second Modified Example 2

In each of the above-described embodiments and the above-described modified examples, the correction-data generating unit 184 may determine whether the amount of change between the minimum value of the correction-data candidate values and the previous correction data falls within a predetermined range and, if the amount of change falls within the predetermined range, determine a minimum value of the correction-data candidate values as correction data. Here, an explanation is given of a case where a modification is applied to the image reading apparatus 200 according to the first modified example.

Figure 14:
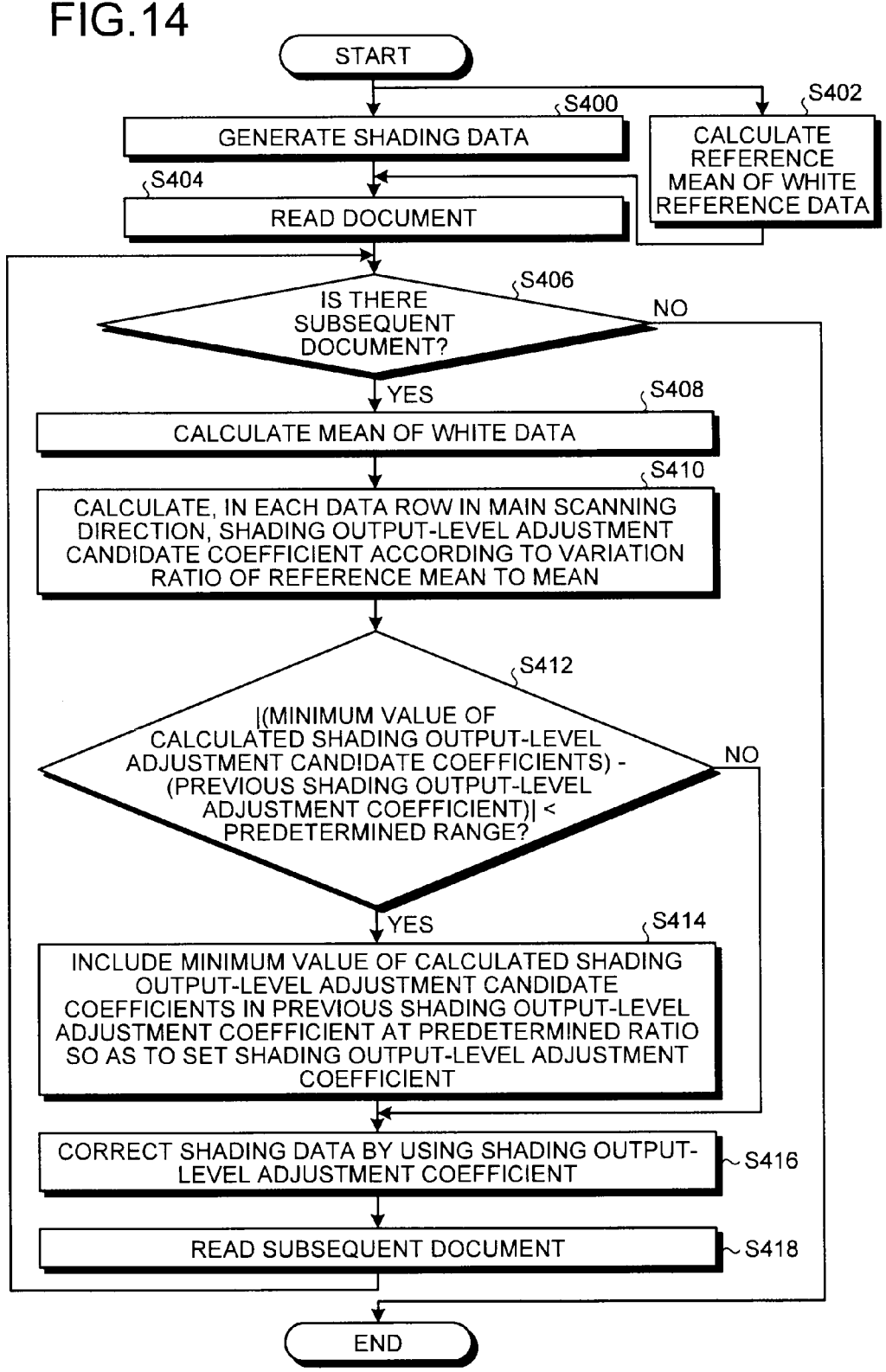
FIG. 14 is a flowchart illustrating an example of a shading correction process performed by the image reading apparatus according to a second modified example.

FIG. 14 is a flowchart illustrating an example of the procedure of a shading correction process performed by the image reading apparatus 200 according to a second modified example.

The processes from step S400 to step S410 are similar to the processes from step S300 to step S310 in the flowchart illustrated in FIG. 13.

The adjustment-coefficient calculation unit 190 determines whether the amount of change between the minimum value of the calculated shading output-level adjustment candidate coefficients and the previous shading output-level adjustment coefficient falls within a predetermined range (step S412). Specifically, the adjustment-coefficient calculation unit 190 determines whether any one of the equation (6) and the equation (7) is satisfied.

$$shlvlcal - shlvlless_{min} \geq lvlsub \qquad (6)$$

$$shlvlless_{min} - shlvlcal \geq lvladd \qquad (7)$$

The plus-side limit of variation is denoted by lvladd, and the minus-side limit of variation is denoted by lvlsub.

If neither the equation (6) nor the equation (7) is satisfied, the adjustment-coefficient calculation unit 190 determines that the amount of change falls within the predetermined range (Yes at step S412) and proceeds to step S414. Conversely, if any one of the equation (6) and the equation (7) is satisfied, the adjustment-coefficient calculation unit 190 determines that the amount of change does not fall within the predetermined range (No at step S412) and proceeds to step S416.

The processes from step S414 to step S418 are similar to the processes from step S312 to step S316 in the flowchart illustrated in FIG. 13.

The minimum value of the correction-data candidate values is set as correction data only if the amount of change between the minimum value of the correction-data candidate values and the previous correction data that is the correction data obtained in the previous correction process falls within a predetermined range; thus, the occurrence of an abnormal image due to dirt or density difference can be prevented.

Third Modified Example

In each of the above-described embodiments and the above-described modified examples, the correction-data generating unit 184 may determine whether the amount of change between the minimum value of the correction-data candidate values and the initial correction data is equal to or greater than a predetermined value and, if the amount of change is equal to or greater than the predetermined value, cancel the generation of correction data and the shading-data generating unit 182 regenerates shading data if the amount of change is equal to or greater than the predetermined value. Here, an explanation is given of a case where a modification is applied to the image reading apparatus 200 according to the second modified example.

Figure 15:
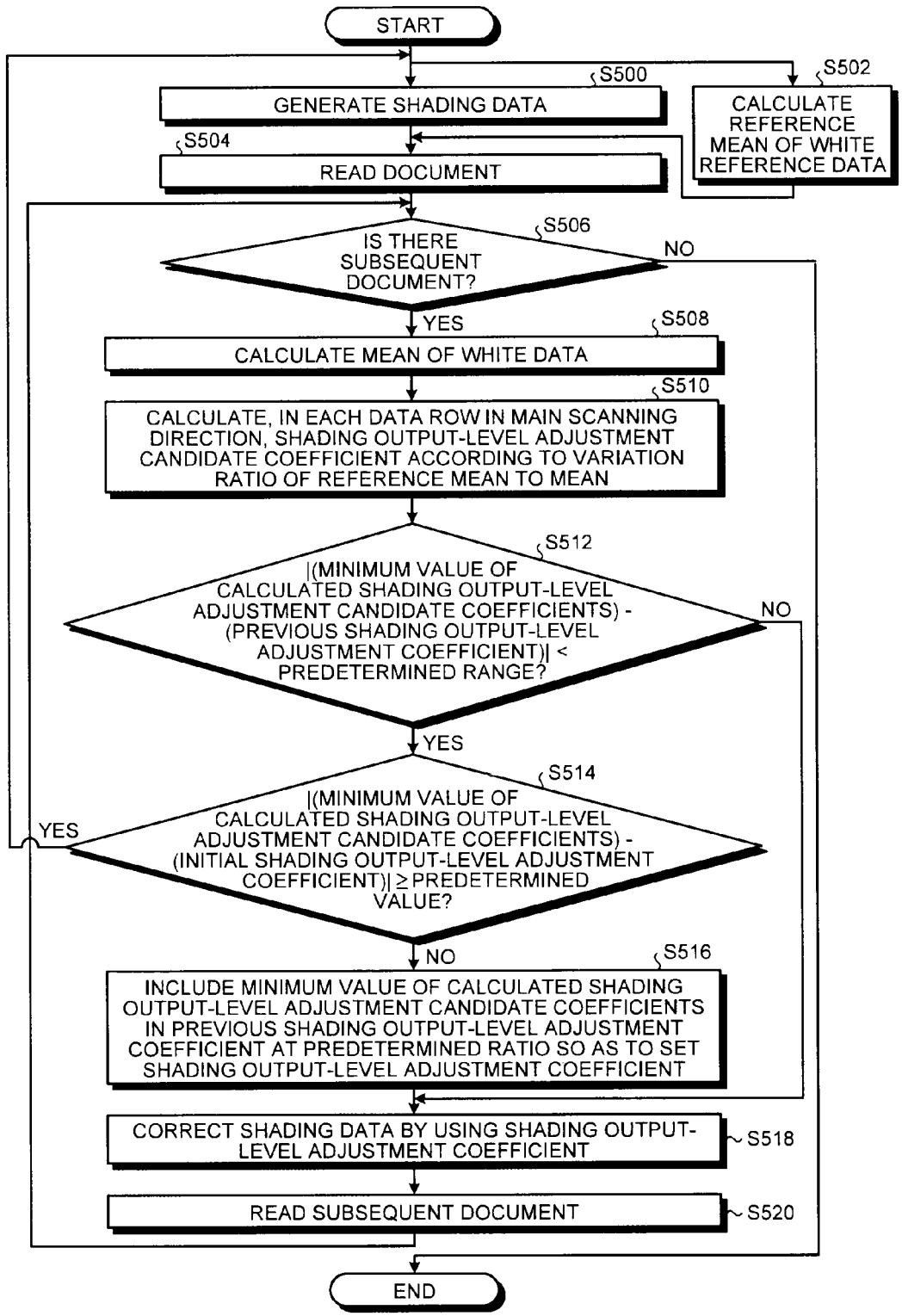
FIG. 15 is a flowchart illustrating an example of a shading correction process performed by the image reading apparatus according to a third modified example.

FIG. 15 is a flowchart illustrating an example of the procedure of a shading correction process performed by the image reading apparatus 200 according to a third modified example.

The processes from step S500 to step S512 are similar to the processes from step S400 to step S412 in the flowchart illustrated in FIG. 14. If No is selected at step S512, the adjustment-coefficient calculation unit 190 causes the process sequence to proceed to step S518.

Then, the adjustment-coefficient calculation unit 190 determines whether the amount of change between the minimum value of the calculated shading output-level adjustment candidate coefficients and the initial shading output-level adjustment coefficient is equal to or greater than a predetermined value (step S514). Specifically, the adjustment-coefficient calculation unit 190 determines whether or not the equation (8) is satisfied.

$$sh\_lvl - shlvlless_{min} \geq lvlvramax \qquad (8)$$

The value for the largest amount of change is denoted by lvlvramax.

If the equation (8) is satisfied, the adjustment-coefficient calculation unit 190 determines that the amount of change is equal to or greater than the predetermined value (Yes at step S514), cancels the generation of correction data, and returns to steps S500 and S502. Thus, the shading-data generating unit 182 regenerates shading data. Conversely, if the equation (8) is not satisfied, the adjustment-coefficient calculation unit 190 determines that the amount of change is less than the predetermined value (No at step S514) and causes the process sequence to proceed to step S516.

The processes from subsequent step S516 to step S520 are similar to the processes from step S414 to step S418 in the flowchart illustrated in FIG. 14.

If the amount of change between the minimum value of the correction-data candidate values and the initial correction data is equal to or greater than a predetermined value, the generation of correction data is cancelled and shading data is regenerated; thus, images can be generated stably even when there is dirt or density variation.

Figure 16:
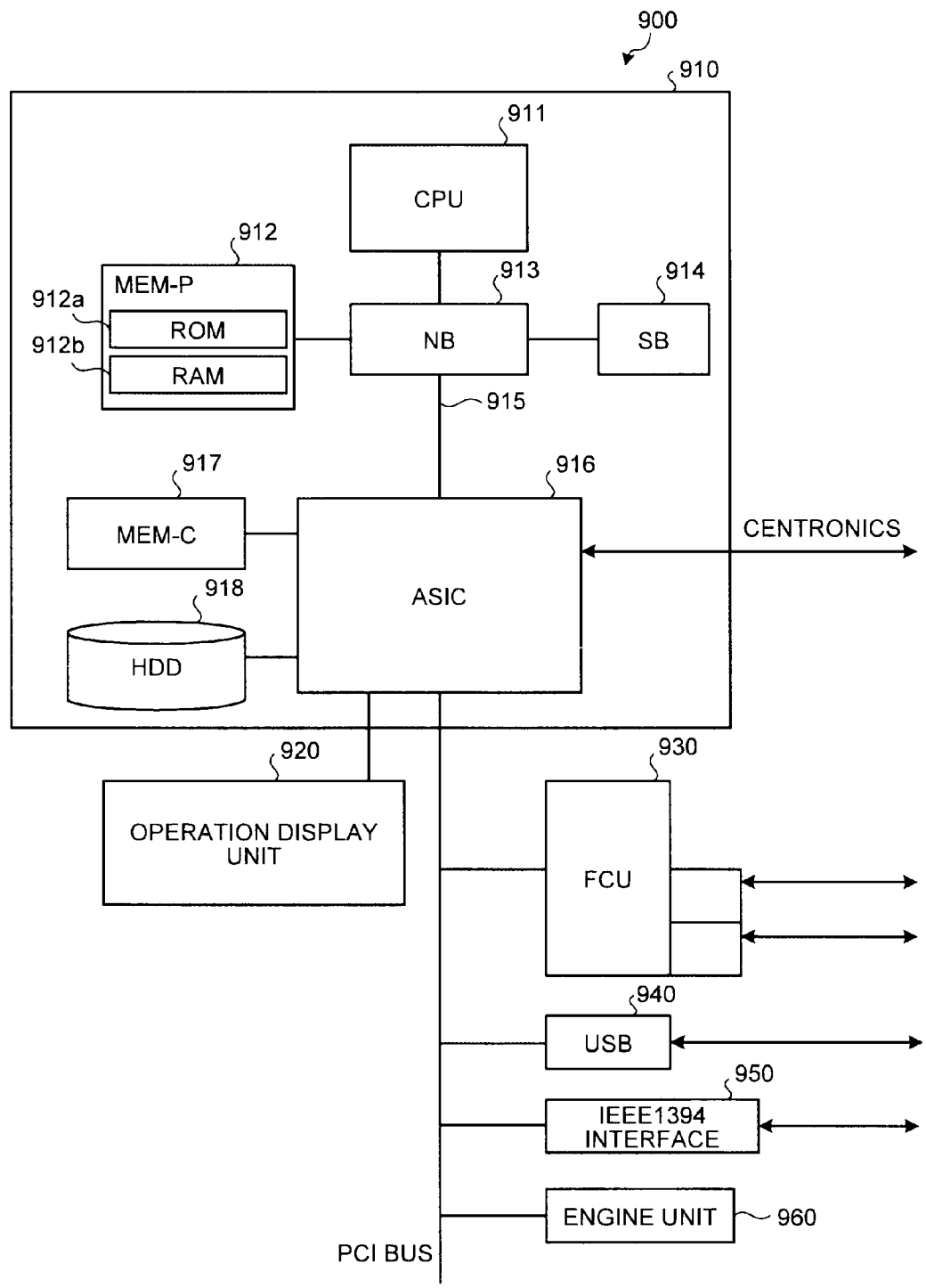
FIG. 16 is a block diagram illustrating an example of the hardware configuration of an image forming apparatus to which the image reading apparatus according to each of the embodiments and modified examples is applied.

FIG. 16 is a block diagram illustrating an example of the hardware configuration of an image forming apparatus 900 to which the image reading apparatus according to each of the above-described embodiments and modified examples is applied. As illustrated in FIG. 16, the image forming apparatus 900 according to the present embodiment has a configuration in which a controller 910 is connected to an engine unit (Engine) 960 via a Peripheral Component Interconnect (PCI) bus. The controller 910 is a controller that controls the entire image forming apparatus 900 and controls drawings, communication, and input from an operation display unit 920. The engine unit 960 is a printer engine, or the like, that is connectable to a PCI bus, such as a black-and-white plotter, a one-drum color plotter, a four-drum color plotter, a scanner, or a fax unit. The engine unit 960 includes an image processing section for error diffusion, gamma transformation, or the like, in addition to what is called an engine section, such as a plotter.

The controller 910 includes a CPU 911, a north bridge (NB) 913, a system memory (MEM-P) 912, a south bridge (SB) 914, a local memory (MEM-C) 917, an application specific integrated circuit (ASIC) 916, and a hard disk drive (HDD) 918. The controller 910 has a configuration in which the north bridge (NB) 913 is connected to the ASIC 916 via an accelerated graphics port (AGP) bus 915. The MEM-P 912 further includes a read-only memory (ROM) 912a and a random access memory (RAM) 912b.

The CPU 911 controls whole of the image forming apparatus 900. The CPU 911 includes a chip set having the NB 913, the MEM-P 912, and the SB 914, so that the CPU 911 is connected to other devices via the chip set.

The NB 913 is a bridge that connects the CPU 911, the MEM-P 912, the SB 914, and the AGP bus 915. The NB 913 includes a memory controller that controls reading from and writing to the MEM-P 912, a PCI master, and an AGP target.

The MEM-P 912 is a system memory used as a memory for storing computer programs and data, a memory for loading computer programs and data, a memory to be used in drawing by a printer, or the like. The MEM-P 912 includes the ROM 912*a* and the RAM 912*b*. The ROM 912*a* is a read-only memory used as a memory for storing computer programs and data, and the RAM 912*b* is a writable and readable memory used as a memory for loading computer programs and data, a memory to be used in drawing by a printer, or the like.

The SB 914 is a bridge to connect the NB 913, a PCI device, and a peripheral device. The SB 914 is connected to the NB 913 via the PCI bus, to which a network interface (I/F) unit, or the like, is also connected.

The ASIC 916 is an integrated circuit (IC) intended for image processing that includes a hardware element for image processing, and has a function of a bridge to connect the AGP bus 915, the PCI bus, the HDD 918, and the MEM-C 917. The ASIC 916 includes a PCI target, an AGP master, an arbiter (ARB) that is the central core of the ASIC 916, a memory controller that controls the MEM-C 917, a plurality of direct memory access controllers (DMACs) that performs the rotation of image data, or the like, using hardware logic, and a PCI unit that performs data transfer with the engine unit 960 via the PCI bus. A fax control unit (FCU) 930, a universal serial bus (USB) 940, an IEEE 1394 (the Institute of Electrical and Electronics Engineers 1394) interface 950 are connected to the ASIC 916 via the PCI bus. The operation display unit 920 is directly connected to the ASIC 916.

The MEM-C 917 is a local memory used as a copy image buffer or a code buffer. The HDD 918 is a storage unit for storing image data, storing computer programs, storing font data, and storing forms.

The AGP bus 915 is a bus interface for a graphics accelerator card provided for speeding up graphics processes and directly accesses the MEM-P 912 at a high throughput so that the speed of the graphics accelerator card is increased.

According to an aspect of the present invention, advantages are produced such that shading correction can be performed at low cost, with a reduced effect of dirt, and without a decrease in image data productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   a reading unit;
   a first white reference member that is located opposing a document read position of the reading unit and whose read point to be read by the reading unit is changed with time;
   a shading-data generating unit that generates shading data;
   a correction-data generating unit that, when a plurality of documents are continuously conveyed to the reading unit, generates correction data to be used for correcting the shading data in each time period in which the document is not read by the reading unit;
   a shading-data correcting unit that corrects the shading data by using the generated correction data; and
   a shading correcting unit that performs, by using the corrected shading data, shading correction on image data of a document that is read by the reading unit after the correction data is generated, wherein
   the correction-data generating unit divides, into a matrix of row blocks in a sub scanning direction and column blocks in a main scanning direction, white data on the first white reference member read by the reading unit during a predetermined time period that is shorter than a time period in which the read point of the first white reference member is returned to a position where the reading unit has started reading the first white reference member, calculates, for each column of the matrix, a correction-data candidate value corresponding to a variation ratio of a mean of data of the row blocks in the sub-scanning direction, and determines a minimum value of the calculated correction-data candidate values as the correction data.

2. The image reading apparatus according to claim 1, further comprising a second white reference member whose read point to be read by the reading unit is fixed, wherein
   the shading-data generating unit generates the shading data by using white reference data on the second white reference member that is read by the reading unit.

3. The image reading apparatus according to claim 1, wherein the shading-data generating unit generates the shading data by using white reference data on the first white reference member that is read by the reading unit.

4. The image reading apparatus according to claim 1, wherein the correction-data generating unit generates the correction data by including, at a predetermined ratio, the minimum value of the correction-data candidate values into previous correction data.

5. The image reading apparatus according to claim 1, wherein the correction-data generating unit determines whether an amount of change between the minimum value of the correction-data candidate values and previous correction data falls within a predetermined range and, if the amount of change falls within the predetermined range, determines a minimum value of the correction-data candidate values as the correction data.

6. The image reading apparatus according to claim 1, wherein
   the correction-data generating unit determines whether an amount of change between the minimum value of the correction-data candidate values and initial correction data is equal to or greater than a predetermined value and, if the amount of change is equal to or greater than the predetermined value, cancels generation of the correction data, and
   the shading-data generating unit regenerates shading data if the amount of change is equal to or greater than the predetermined value.

7. The image reading apparatus according to claim 1, wherein the mean of the row blocks in the sub-scanning direction is a maximum value of the values of the row blocks in the sub-scanning direction.

8. The image reading apparatus according to claim 1, wherein the first white reference member has a shape of a roller.

9. An image forming apparatus comprising:
   an image reading apparatus including:
   a reading unit;

a first white reference member that is located opposing a document read position of the reading unit and whose read point to be read by the reading unit is changed with time;

a shading-data generating unit that generates shading data;

a correction-data generating unit that, when a plurality of documents are continuously conveyed to the reading unit, generates correction data to be used for correcting the shading data in each time period in which the document is not read by the reading unit;

a shading-data correcting unit that corrects the shading data by using the generated correction data;

a shading correcting unit that performs, by using the corrected shading data, shading correction on image data of a document that is read by the reading unit after the correction data is generated, wherein the correction-data generating unit divides, into a matrix of row blocks in a sub scanning direction and column blocks in a main scanning direction, white data on the first white reference member read by the reading unit during a predetermined time period that is shorter than a time period in which the read point of the first white reference member is returned to a position where the reading unit has started reading the first white reference member, calculates, for each column of the matrix, a correction-data candidate value corresponding to a variation ratio of a mean of data of the row blocks in the sub-scanning direction, and determines a minimum value of the calculated correction-data candidate values as the correction data; and an image forming apparatus that forms an image by using the image data on which the shading correction has been performed.

10. A shading correction method performed by an image reading apparatus, the image reading apparatus including
- a reading unit; and
- a first white reference member that is located in opposing to a document read position of the reading unit, a read point of the first white reference member that is read by the reading unit being changing with time, the method comprising:

generating shading data by shading data generating unit;

generating, when a plurality of documents are continuously conveyed by the reading unit, correction data in each time period in which the document is not read by the reading unit, the correction data being used for correcting the shading data;

correcting the shading data by using the generated correction data; and performing, by using the corrected shading data, shading correction on image data of a document that is read by the reading unit after the correction data is generated, wherein the generating the correction data includes dividing, into a matrix of row blocks in a sub scanning direction and column blocks in a main scanning direction, white data on the first white reference member read by the reading unit during a predetermined time period that is shorter than a time period in which the read point of the first white reference member is returned to a position where the reading unit has started reading the first white reference member, calculating, for each column of the matrix, a correction-data candidate value corresponding to a variation ratio of a mean of data of the row blocks arranged in the sub-scanning direction, and determining a minimum value of the calculated correction-data candidate values as the correction data.

* * * * *